(12) United States Patent
Suwazono et al.

(10) Patent No.: US 9,467,017 B2
(45) Date of Patent: Oct. 11, 2016

(54) INTER-PHASE INSULATION SHEET FOR ROTATING ELECTRIC MACHINE

(75) Inventors: Takeshi Suwazono, Tokyo (JP); Junichi Aoki, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 735 days.

(21) Appl. No.: 13/880,548

(22) PCT Filed: Oct. 17, 2011

(86) PCT No.: PCT/JP2011/073788
§ 371 (c)(1),
(2), (4) Date: Jul. 23, 2013

(87) PCT Pub. No.: WO2012/053464
PCT Pub. Date: Apr. 26, 2012

(65) Prior Publication Data
US 2013/0307368 A1 Nov. 21, 2013

(30) Foreign Application Priority Data
Oct. 22, 2010 (JP) .................................. 2010-237075

(51) Int. Cl.
*H02K 3/34* (2006.01)
*H02K 3/38* (2006.01)

(52) U.S. Cl.
CPC ................ *H02K 3/34* (2013.01); *H02K 3/345* (2013.01); *H02K 3/38* (2013.01)

(58) Field of Classification Search
CPC ........... H02K 3/34; H02K 3/38; H02K 3/345
USPC ........................................ 310/214, 215, 260
See application file for complete search history.

(56) References Cited

U.S. PATENT DOCUMENTS 4,588,916 A * 5/1986 Lis ............................ H02K 3/38
174/DIG. 20

5,659,219 A * 8/1997 Momose .................. H02K 3/38
29/596

(Continued)

FOREIGN PATENT DOCUMENTS

JP 64-16152 U 1/1989
JP 07-298530 A 11/1995

(Continued)

OTHER PUBLICATIONS

International Search Report received in PCT/JP2011/073788 dated Jan. 17, 2012.

*Primary Examiner* — John K Kim
(74) *Attorney, Agent, or Firm* — Foley & Lardner LLP

(57) ABSTRACT

The purpose of the present invention is to provide an inter-phase insulation sheet for a rotating electric machine, wherein it is possible to produce the effects of exerting excellent insertion workability between coil ends of different phases, of preventing the positional misalignment of the inter-phase insulation sheet during production work when forming the coils or when lacing, of preventing the inter-phase insulation sheet from tearing when lacing, and of being able to reliably ensure that the coil ends are insulated from one another even when the shape of the coil ends are not the same. In order to achieve the aforementioned purpose, an inter-phase insulation sheet (11) has a fixed section (13) and a movable section (14). The movable section (14) has a base section (14A) on one side and a flanged section (14B) on the other side. The fixed section and the base section are placed so to completely overlap with one another and are inserted between coil ends (23b) of different phases. Meanwhile, the flanged section passes the inner side (23c) of one of the coil ends of different phases and is drawn from the insulation sheet insertion side of the coil end out to the side opposite that of the insulation sheet insertion side. Moreover, in order to facilitate the flanged section to be drawn out, a slit is formed between the fixed section and the base section and between the center and the side of the base section.

10 Claims, 11 Drawing Sheets

(56) References Cited

U.S. PATENT DOCUMENTS

| | | | |
|---|---|---|---|
| 6,043,584 A * | 3/2000 | DeHart | H02K 3/38 310/194 |
| 8,125,118 B2 * | 2/2012 | Nissen | H02K 3/38 310/214 |
| 2004/0183391 A1 | 9/2004 | Kimura et al. | |
| 2009/0091206 A1 * | 4/2009 | Nissen | H02K 3/38 310/215 |
| 2013/0307368 A1 * | 11/2013 | Suwazono | H02K 3/38 310/215 |

FOREIGN PATENT DOCUMENTS

| | | |
|---|---|---|
| JP | 2006-262629 A | 9/2006 |
| JP | 2004-289930 A | 10/2008 |

* cited by examiner

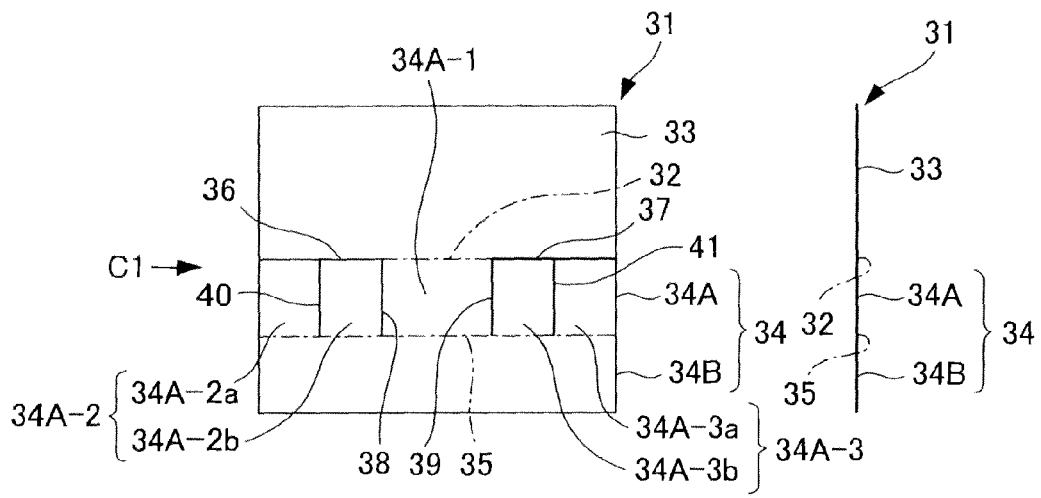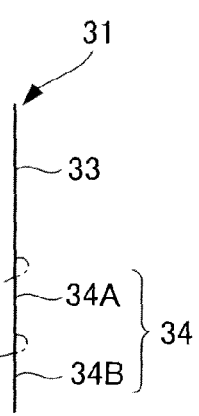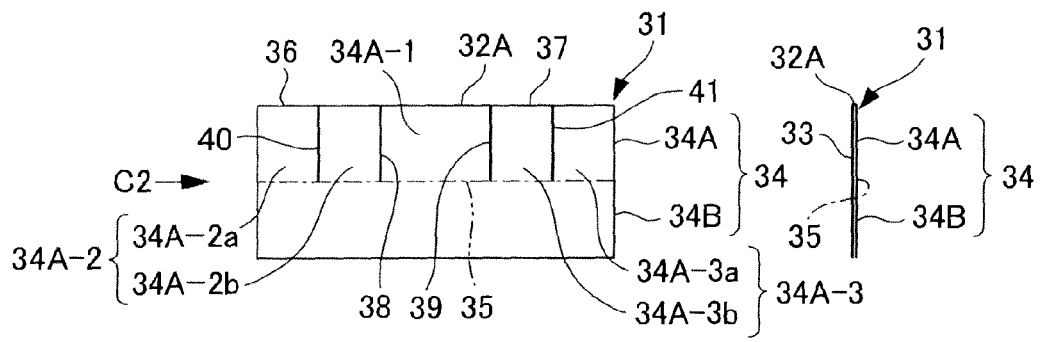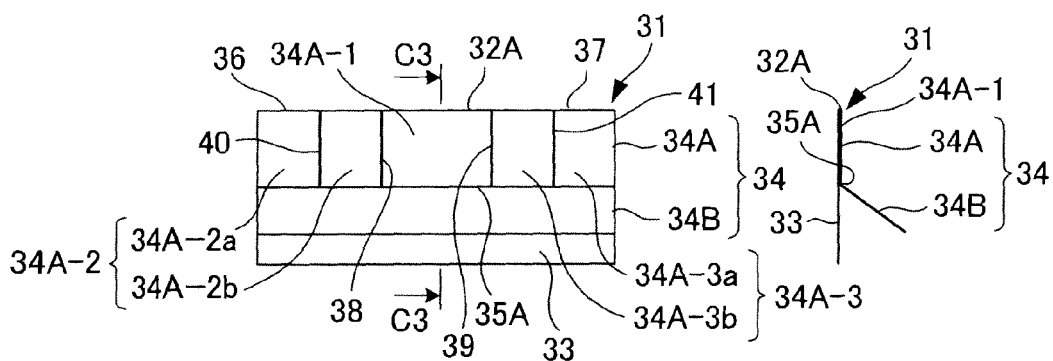

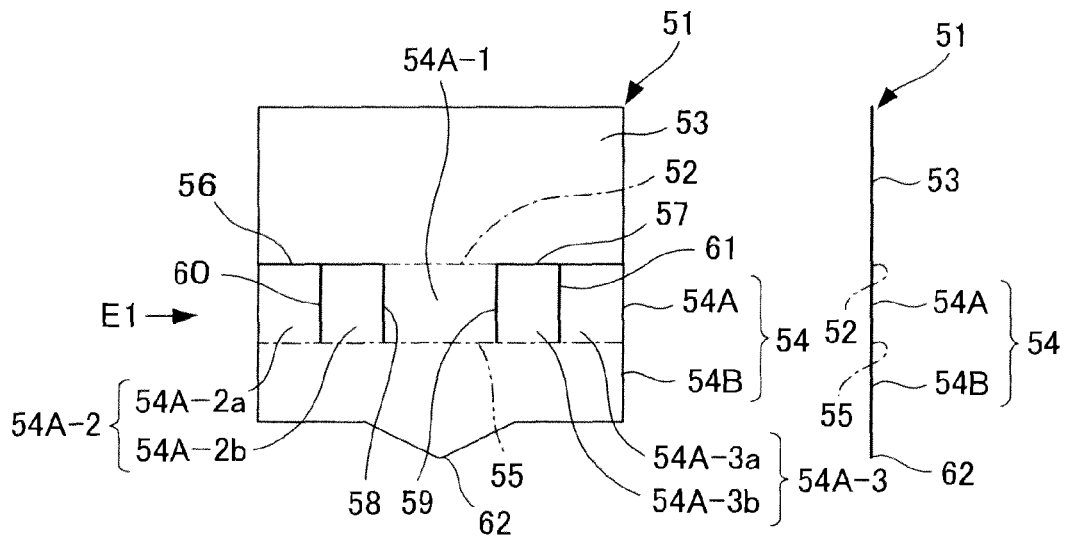
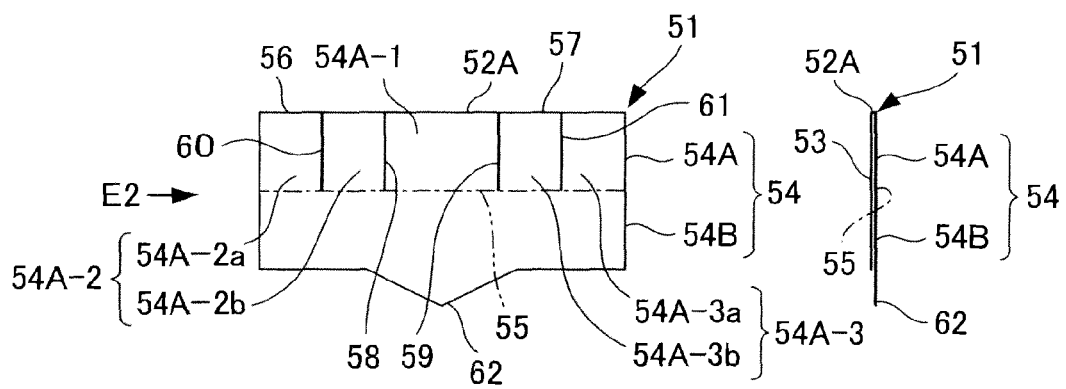
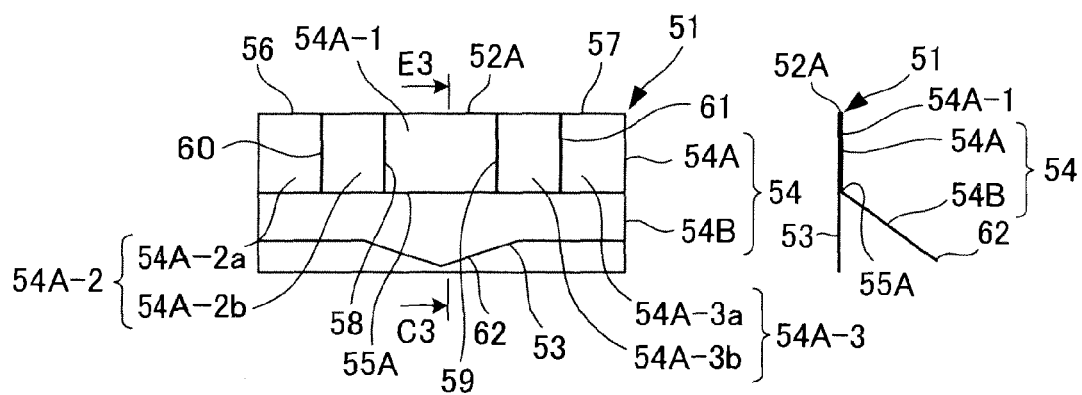

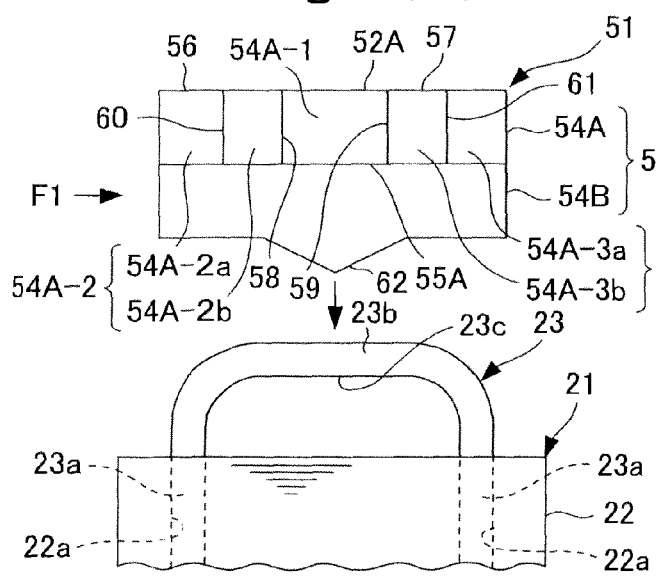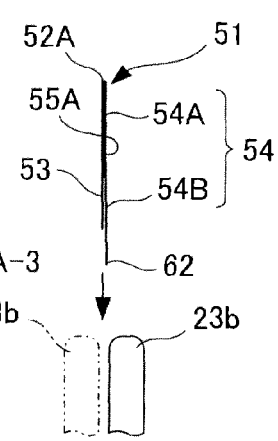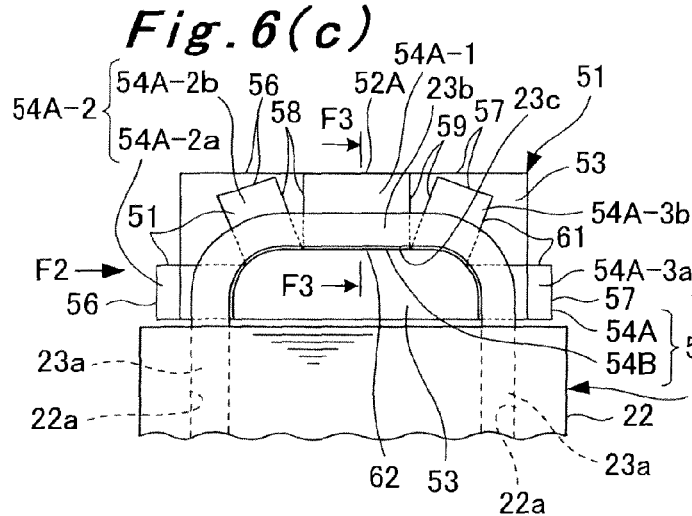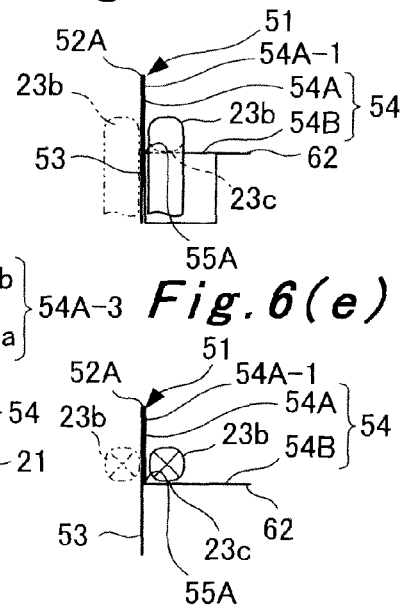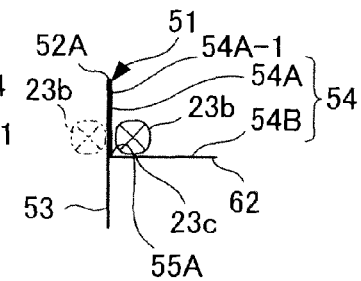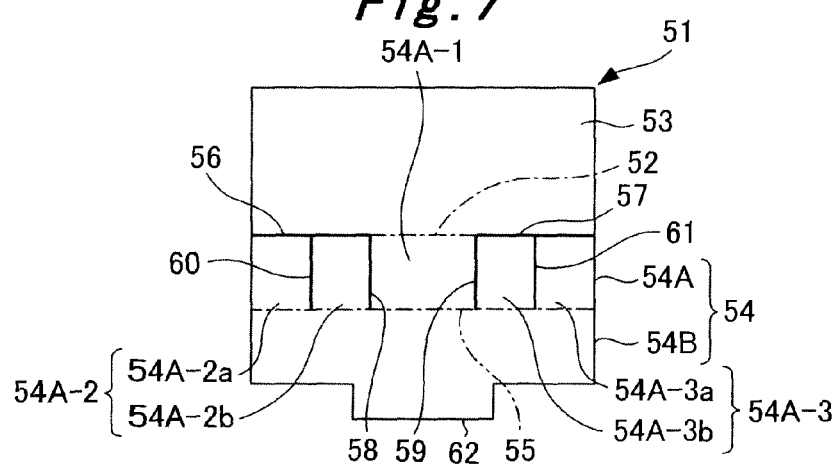

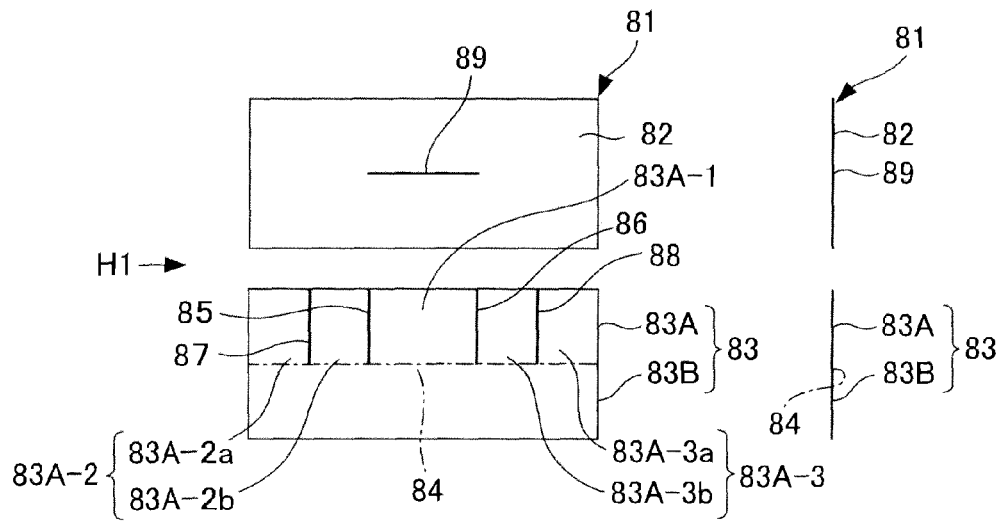
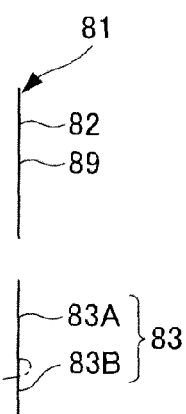
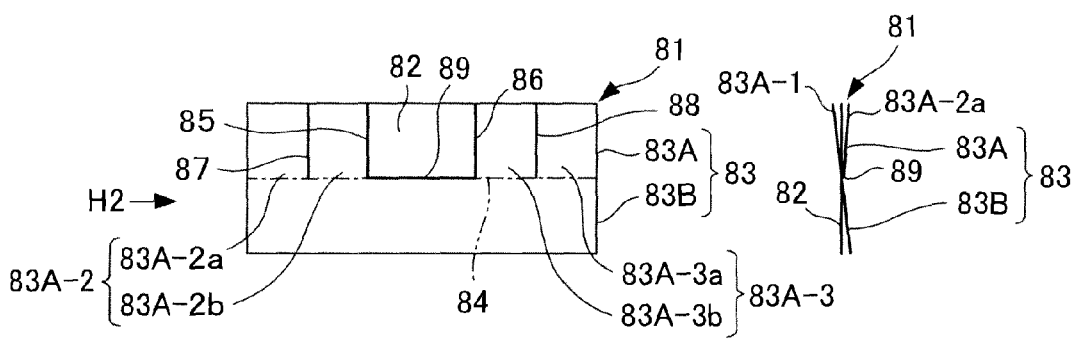
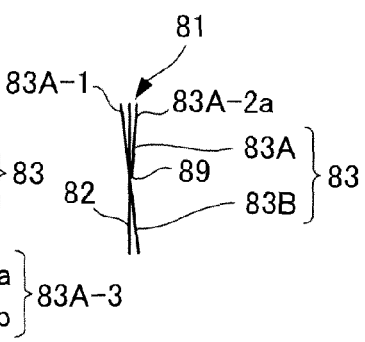
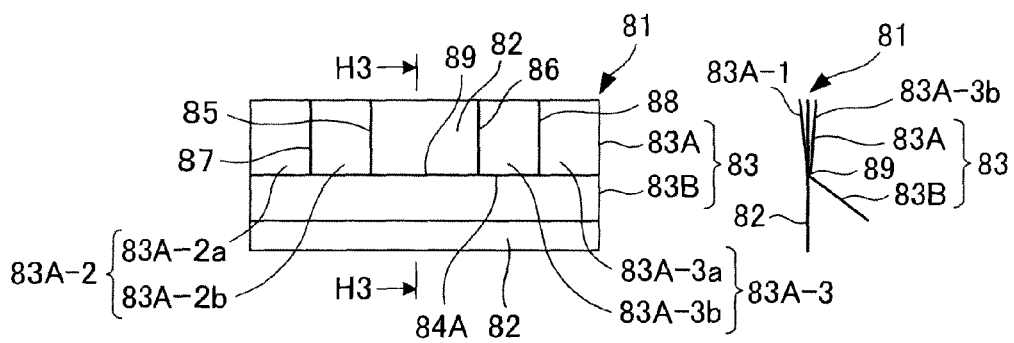

INTER-PHASE INSULATION SHEET FOR ROTATING ELECTRIC MACHINE

TECHNICAL FIELD

The present invention relates to an inter-phase insulation paper sheet for a rotating electric machine such as a three-phase AC motor.

BACKGROUND ART

The stator of a three-phase AC motor includes a stator core and coils with three-phase windings fitted in slots in this stator core. Moreover, the coil of each phase includes: a part being a coil side inserted in the corresponding slot; and a part being a coil end situated outside the slot.

Further, an inter-phase insulation paper sheet is inserted between the adjacent coil ends of different phases to provide insulation between these coil ends of the different phases. The inter-phase insulation paper sheet after inserted between the coil ends is fixed to the coil ends by being tied thereto with a lace (lacing).

As general, conventional inter-phase insulation paper sheets, there are a rectangular inter-phase insulation paper sheet 1 as shown in Part (a) of FIG. 12, an inter-phase insulation paper sheet 2 with one end side formed in a trapezoidal shape as shown in Part (b) of FIG. 12, and the like.

Moreover, Patent Documents 1 and 2 listed below disclose inter-phase insulation paper sheets with improvements for solving problems in the inter-phase insulation paper sheets 1 and 2 of these simple shapes. The inter-phase insulation paper sheet disclosed in Patent Document 1 is folded in a V shape so as to increase its strength against tear. The inter-phase insulation paper sheet disclosed in Patent Document 2 includes flat portions and folded portions, and uses the elasticity of the folded portions to absorb changes in the gaps between coil ends and thereby prevent displacement of the inter-phase insulation paper sheet after its insertion between the coil ends.

PRIOR ART DOCUMENT

Patent Document

Patent Document 1: Japanese Patent Application Publication No. 2006-262629
Patent Document 2: Japanese Patent Application Publication No. Hei 7-298530

SUMMARY OF THE INVENTION

Problems to be Solved by the Invention

Meanwhile, if the general, conventional inter-phase insulation paper sheets 1 and 2 are thin, they are soft and thus have poor insertability between coil ends. Moreover, in this case, the inter-phase insulation paper sheets 1 and 2 might be torn during the lacing, thus possibly allowing contact between the coil ends and causing dielectric breakdown.

Moreover, if the general, conventional inter-phase insulation paper sheets 1 and 2 are thick, they are hard and thus have good insertability between coil ends. It is, however, difficult for the inter-phase insulation paper sheets 1 and 2 to conform with the shapes of the coil ends after the insertion between the coil ends; thus, they can be easily displaced during manufacturing operations such as the coil shaping and the lacing. For this reason, the inter-phase insulation paper sheets 1 and 2 might be displaced from their right insertion positions (the predetermined insertion positions enabling insulation between the coil ends), thus possibly allowing contact between the coil ends and causing dielectric breakdown. In addition, if the coil ends are lying over one another, it is difficult to check whether or not the inter-phase insulation paper sheets 1 and 2 are inserted at the right insertion positions.

Moreover, the inter-phase insulation paper sheet disclosed in Patent Document 1 is superior to the inter-phase insulation paper sheets 1 and 2 in terms of strength against tear because it is folded in a V shape. However, such a feature does not provide a solution to the problem of poor insertability between coil ends caused by small thickness and of likeliness to displacement after insertion between coil ends caused by large thickness.

The inter-phase insulation paper sheet disclosed in Patent Document 2 can prevent its displacement by using the elasticity of the folded portions to absorb changes in the gaps between coil ends. However, if the inter-phase insulation paper sheet has a thickness large enough to be easily inserted between the coil ends, it is difficult for the inter-phase insulation paper sheet to conform with the shapes of the coil ends. Thus, it is impossible to completely prevent the occurrence of displacement during the manufacturing operations such as the coil shaping and the lacing. This leads to a problem of failing to achieve improved insulation reliability.

Thus, in view of the above circumstances, an object of the present invention is to provide an inter-phase insulation paper sheet for a rotating electric machine such as a three-phase AC motor which can offer advantageous effects such as: being capable of achieving good insertability between coil ends of different phases; being unlikely to be displaced during manufacturing operations such as coil shaping and lacing; being unlikely to be torn during the lacing; and also being capable of reliably securing insulation between the coil ends even in the case where the shapes of the coil ends are uneven.

Means for Solving the Problems

An inter-phase insulation paper sheet for a rotating electric machine according to a first aspect of the invention for solving the above problems is an inter-phase insulation paper sheet for a rotating electric machine configured to be inserted between coil ends of different phases provided to a stator core of the rotating electric machine so as to provide insulation between the coil ends of the different phases, characterized in that the inter-phase insulation paper sheet comprises a fixed portion and a movable portion, the movable portion has a base portion on one end side and a collar portion on the other end side, and the fixed portion and the base portion overlap each other and are inserted between the coil ends of the different phases while the collar portion is drawn out of an insulation-paper-sheet insertion side of one of the coil ends of the different phases to an opposite insulation-paper-sheet insertion side of the one coil end through an inner side of the one coil end.

An inter-phase insulation paper sheet for a rotating electric machine according to a second aspect of the invention is the inter-phase insulation paper sheet for a rotating electric machine according to the first aspect of the invention, characterized in that the fixed portion and the movable portion are integral with each other.

An inter-phase insulation paper sheet for a rotating electric machine according to a third aspect of the invention is the inter-phase insulation paper sheet for a rotating electric machine according to the first aspect of the invention, characterized in that the fixed portion and the movable portion are separated from each other.

An inter-phase insulation paper sheet for a rotating electric machine according to a fourth aspect of the invention is the inter-phase insulation paper sheet for a rotating electric machine according to the second aspect of the invention, characterized in that a slit extending in a width direction is provided between the fixed portion and the base portion of the movable portion on both sides in the width direction, so that the base portion is shaped to have a center portion which is connected to the fixed portion and side portions which are separated from the fixed portion, a slit extending in a longitudinal direction is provided between the center portion and each of the side portions of the base portion, and the center portion and each of the side portions are in a state of spreading out in a V shape.

An inter-phase insulation paper sheet for a rotating electric machine according to a fifth aspect of the invention is the inter-phase insulation paper sheet for a rotating electric machine according to the third aspect of the invention, characterized in that a center portion of the base portion of the movable portion is fixed to the fixed portion by use of fixing means, a slit extending in a longitudinal direction is provided between the center portion and each of side portions of the base portion, and the center portion and each of the side portions are in a state of spreading out in a V shape.

An inter-phase insulation paper sheet for a rotating electric machine according to a sixth aspect of the invention is the inter-phase insulation paper sheet for a rotating electric machine according to the fifth aspect of the invention, characterized in that the center portion of the base portion is fixed to the fixed portion by being inserted into a slit hole provided in the fixed portion.

An inter-phase insulation paper sheet for a rotating electric machine according to a seventh aspect of the invention is the inter-phase insulation paper sheet for a rotating electric machine according to any one of the fourth to sixth aspects of the invention, characterized in that each of the side portions of the base portion is provided with at least one slit extending in the longitudinal direction to be split into at least two portions, and each of the split portions and the center portion are in a state of spreading out in a V shape.

An inter-phase insulation paper sheet for a rotating electric machine according to an eighth aspect of the invention is the inter-phase insulation paper sheet for a rotating electric machine according to any one of the first to seventh aspects of the invention, characterized in that a protrusion is given to the collar portion of the movable portion.

An inter-phase insulation paper sheet for a rotating electric machine according to a ninth aspect of the invention is the inter-phase insulation paper sheet for a rotating electric machine according to any one of the first to eighth aspects of the invention, characterized in that an extension collar portion is provided to the collar portion of the movable portion.

Effects of the Invention

The inter-phase insulation paper sheet for a rotating electric machine according to the first aspect of the invention is an inter-phase insulation paper sheet for a rotating electric machine configured to be inserted between coil ends of different phases provided to a stator core of the rotating electric machine so as to provide insulation between the coil ends of the different phases, characterized in that: the inter-phase insulation paper sheet comprises the fixed portion and the movable portion; the movable portion has the base portion on one end side and the collar portion on the other end side; and the fixed portion and the base portion overlap each other and are inserted between the coil ends of the different phases while the collar portion is drawn out of the insulation-paper-sheet insertion side of one of the coil ends of the different phases to the opposite insulation-paper-sheet insertion side of the one coil end through the inner side of the one coil end. Thus, the following operations and effects can be achieved.

(1) The inter-phase insulation paper sheet can be inserted between the coil ends of different phases with the fixed portion and the movable portion overlapping each other. Here, the fixed portion and the movable portion simply overlap each other and can therefore be easily inserted between the coil ends. Moreover, since the fixed portion and the movable portion overlap each other, the inter-phase insulation paper sheet can secure its thickness. Accordingly, the insertability of the inter-phase insulation paper sheet between the coil ends can be further improved.

(2) Moreover, since the fixed portion and the movable portion overlap each other, the inter-phase insulation paper sheet is less likely to be torn during the lacing and the like.

(3) Furthermore, since the collar portion is drawn out of the insulation-paper-sheet insertion side of one of the coil ends to the opposite insulation-paper-sheet insertion side of the one coil end through the inner side of the one coil end, the collar portion is caught on the coil end and thus prevents displacement of the inter-phase insulation paper sheet. Accordingly, displacement of the inter-phase insulation paper sheet is less likely to occur during manufacturing operations such as the coil shaping and the lacing, and therefore the insulation between the coil ends can be secured.

The inter-phase insulation paper sheet for a rotating electric machine according to the second aspect of the invention is the inter-phase insulation paper sheet for a rotating electric machine according to the first aspect of the invention, characterized in that the fixed portion and the movable portion are integral with each other. Thus, the movable portion does not need to be fixed to the fixed portion by use of fixing means; the movable portion only needs to be folded over the fixed portion. Accordingly, the operation of preparing the inter-phase insulation paper sheet is easy.

The inter-phase insulation paper sheet for a rotating electric machine according to the third aspect of the invention is the inter-phase insulation paper sheet for a rotating electric machine according to the first aspect of the invention, characterized in that the fixed portion and the movable portion are separated from each other. Thus, the shapes of the fixed portion and the movable portion can be designed freely. Accordingly, the fixed portion and the movable portion can be easily manufactured in shapes that fit into the shapes of the coil ends.

The inter-phase insulation paper sheet for a rotating electric machine according to the fourth aspect of the invention is the inter-phase insulation paper sheet for a rotating electric machine according to the second aspect of the invention, characterized in that: the slit extending in the width direction is provided between the fixed portion and the base portion of the movable portion on both sides in the width direction, so that the base portion is shaped to have the center portion which is connected to the fixed portion and the side portions which are separated from the fixed portion; the slit extending in the longitudinal direction is provided between the center portion and each of the side portions of the base portion; and the center portion and each of the side portions are in the state of spreading out in the V shape. Thus, the following operations and effects can be achieved.

(1) When the collar portion is drawn out of the insulation-paper-sheet insertion side of the coil end to the opposite insulation-paper-sheet insertion side thereof, the center portion and each of the side portions of the base portion of the movable portion spread out in the V shape (a fan shape). Accordingly, the operation of drawing out the collar portion can be done easily.

(2) The center portion of the base portion and the fixed portion remain unmoved even when the side portions of the base portion and the collar portion of the movable portion are moved during the coil shaping, the lacing, and the like. Accordingly, the insulation between the coil ends can be secured.

(3) The side portions of the base portion and the collar portion of the movable portion are freely movable. Accordingly, the insulation between the coil ends can be secured even when the shapes of the coil ends are uneven.

The inter-phase insulation paper sheet for a rotating electric machine according to the fifth aspect of the invention is the inter-phase insulation paper sheet for a rotating electric machine according to the third aspect of the invention, characterized in that; the center portion of the base portion of the movable portion is fixed to the fixed portion by use of the fixing means; the slit extending in the longitudinal direction is provided between the center portion and each of side portions of the base portion; and the center portion and each of the side portions are in the state of spreading out in the V shape. Thus, the following operations and effects can be achieved, as in the case of the inter-phase insulation paper sheet for a rotating electric machine according to the fourth aspect of the invention.

(1) When the collar portion is drawn out of the insulation-paper-sheet insertion side of the coil end to the opposite insulation-paper-sheet insertion side thereof, the center portion and each of the side portions of the base portion of the movable portion spread out in the V shape (a fan shape). Accordingly, the operation of drawing out the collar portion can be done easily.

(2) The center portion of the base portion and the fixed portion remain unmoved even when the side portions of the base portion and the collar portion of the movable portion are moved during the coil shaping, the lacing, and the like. Accordingly, the insulation between the coil ends can be secured.

(3) The side portions of the base portion and the collar portion of the movable portion are freely movable. Accordingly, the insulation between the coil ends can be secured even when the shapes of the coil ends are uneven.

The inter-phase insulation paper sheet for a rotating electric machine according to the sixth aspect of the invention is the inter-phase insulation paper sheet for a rotating electric machine according to the fifth aspect of the invention, characterized in that the center portion of the base portion is fixed to the fixed portion by being inserted into the slit hole provided in the fixed portion. Accordingly, fixing means can be realized which allows easy fixing of the center portion of the base portion of the movable portion to the fixed portion.

The inter-phase insulation paper sheet for a rotating electric machine according to the seventh aspect of the invention is the inter-phase insulation paper sheet for a rotating electric machine according to any one of the fourth to sixth aspects of the invention, characterized in that: each of the side portions of the base portion is provided with the at least one slit extending in the longitudinal direction to be split into the at least two portions; and each of the split portions and the center portion are in the state of spreading out in the V shape. This is more effective than the inter-phase insulation paper sheets according the fourth to sixth aspects of the invention. Specifically, the following operations and effects can be achieved.

(1) When the collar portion is drawn out of the insulation-paper-sheet insertion side of the coil end to the opposite insulation-paper-sheet insertion side thereof, the center portion and each of the split portions of the side portions of the base portion of the movable portion spread out in the V shape (a fan shape). Accordingly, the operation of drawing out the collar portion can be done more easily.

(2) The center portion of the base portion and the fixed portion remain unmoved even when the split portions of the side portions of the base portion and the collar portion of the movable portion are moved during the coil shaping, the lacing, and the like. Accordingly, the insulation between the coil ends can be secured more reliably.

(3) The split portions of the side portions of the base portion and the collar portion of the movable portion are freely movable. Accordingly, the insulation between the coil ends can be secured more reliably even when the shapes of the coil ends are uneven.

The inter-phase insulation paper sheet for a rotating electric machine according to the eighth aspect of the invention is the inter-phase insulation paper sheet for a rotating electric machine according to any one of the first to seventh aspects of the invention, characterized in that the protrusion is given to the collar portion of the movable portion. Thus, when the collar portion is to be drawn out of the insulation-paper-sheet insertion side of one of the coil ends to the opposite insulation-paper-sheet insertion side of the one coil end through the inner side of the one coil end, the operator can draw out the collar portion by holding the protrusion. Accordingly, the operation of drawing out the collar portion can be made easier.

The inter-phase insulation paper sheet for a rotating electric machine according to the ninth aspect of the invention is the inter-phase insulation paper sheet for a rotating electric machine according to any one of the first to eighth aspects of the invention, characterized in that the extension collar portion is provided to the collar portion of the movable portion. Accordingly, the laying of the collar portions over the coil end can be done reliably.

BRIEF DESCRIPTION OF THE DRAWINGS

FIG. 3 Part (a) is a front view showing a state before a fixed portion and a movable portion of an inter-phase insulation paper sheet for a three-phase AC motor according to Embodiment 2 of the present invention are set to overlap (folded over) each other. Part (b) is a side view seen in the direction of arrow C1 in Part (a). Part (c) is a front view showing a state where the fixed portion and the movable portion of the inter-phase insulation paper sheet are set to overlap each other. Part (d) is a side view seen in the direction of arrow C2 in Part (c). Part (e) is a front view showing a state where a collar portion of the inter-phase insulation paper sheet is folded. Part (f) is a cross-sectional view taken along line C3-C3 in Part (e) and seen in the direction of arrows C3 in Part (e).

FIG. 5 Part (a) is a front view showing a state before a fixed portion and a movable portion of an inter-phase insulation paper sheet for a three-phase AC motor according to Embodiment 3 of the present invention are set to overlap (folded over) each other. Part (b) is a side view seen in the direction of arrow E1 in Part (a). Part (c) is a front view showing a state where the fixed portion and the movable portion of the inter-phase insulation paper sheet are set to overlap each other. Part (d) is a side view seen in the direction of arrow E2 in Part (c). Part (e) is a front view showing a state where a collar portion of the inter-phase insulation paper sheet is folded. Part (f) is a cross-sectional view taken along line E3-E3 in Part (e) and seen in the direction of arrows E3 in Part (e).

FIG. 6 Part (a) is a front view showing a state where the inter-phase insulation paper sheet for a three-phase AC motor according to Embodiment 3 of the present invention is about to be inserted between coil ends of different phases. Part (b) is a side view seen in the direction of arrow F1 in Part (a). Part (c) is a front view showing a state where the inter-phase insulation paper sheet is inserted between the coil ends of the different phases. Part (d) is a side view seen in the direction of arrow F2 in Part (c). Part (e) is a cross-sectional view taken along line F3-F3 in Part (c) and seen in the direction of arrows F3 in Part (c).

FIG. 7 is a front view showing a state before a fixed portion and a movable portion of another inter-phase insulation paper sheet for a three-phase AC motor according to Embodiment 3 of the present invention are set to overlap (folded over) each other.

FIG. 9 Part (a) is a front view showing a state before a fixed portion and a movable portion of an inter-phase insulation paper sheet for a three-phase AC motor according to Embodiment 5 of the present invention are set to overlap each other. Part (b) is a side view seen in the direction of arrow H1 in Part (a). Part (c) is a front view showing a state where the fixed portion and the movable portion of the inter-phase insulation paper sheet are set to overlap each other. Part (d) is a side view seen in the direction of arrow H2 in Part (c). Part (e) is a front view showing a state where a collar portion and an extension collar portion of the inter-phase insulation paper sheet are folded. Part (f) is a cross-sectional view taken along line H3-H3 in Part (e) and seen in the direction of arrows H3 in Part (e).

MODES FOR CARRYING OUT THE INVENTION

Hereinbelow, embodiments of the present invention will be described in detail based on the drawings.

Embodiment 1

First, the configuration of an inter-phase insulation paper sheet 11 for a three-phase AC motor according to Embodiment 1 of the present invention will be described based on Parts (a) to (f) of FIG. 1.

As shown in Parts (a) and (b) of FIG. 1, the inter-phase insulation paper sheet 11 of Embodiment 1 is a single rectangular sheet, and a side thereof above a center fold line (an imaginary line: the line may be an actually drawn line) 12 (one end side) is a fixed portion 13 while a side thereof below the fold line 12 (the other end side) is a movable portion 14. That is, the inter-phase insulation paper sheet 11 has the fixed portion 13 and the movable portion 14 integral with each other. Moreover, a side of the movable portion 14 above a center fold line (an imaginary line: the line may be an actually drawn line) 15 (one end side) is a base portion 14A while a side thereof below the fold line 15 (the other end side) is a collar portion 14B.

Figures 1A, 1B:
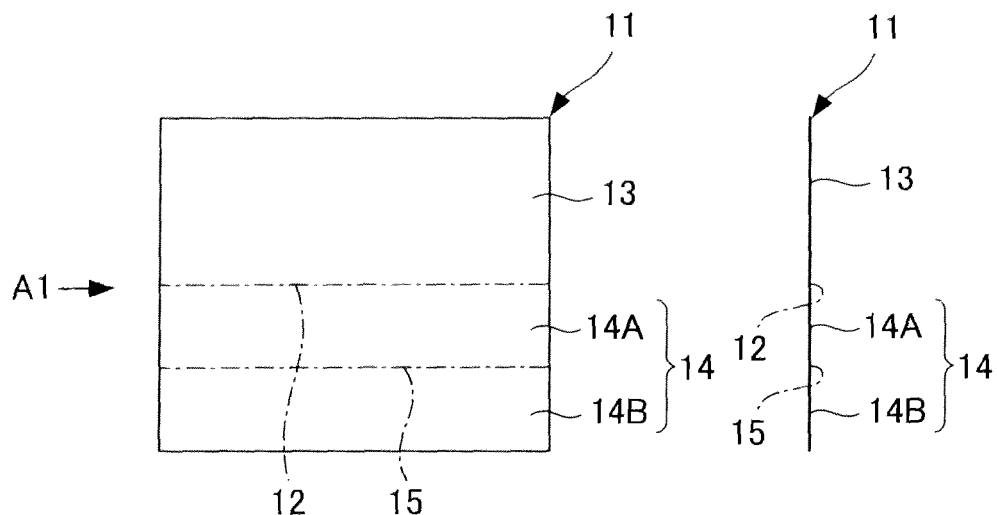
FIG. 1 Part (a) is a front view showing a state before a fixed portion and a movable portion of an inter-phase insulation paper sheet for a three-phase AC motor according to Embodiment 1 of the present invention are set to overlap (folded over) each other. Part (b) is a side view seen in the direction of arrow A1 in Part (a). Part (c) is a front view showing a state where the fixed portion and the movable portion of the inter-phase insulation paper sheet are set to overlap each other. Part (d) is a side view seen in the direction of arrow A2 in Part (c). Part (e) is a front view showing a state where a collar portion of the inter-phase insulation paper sheet is folded. Part (f) is a side view seen in the direction of arrow A3 in Part (e).
Figures 1C, 1D:
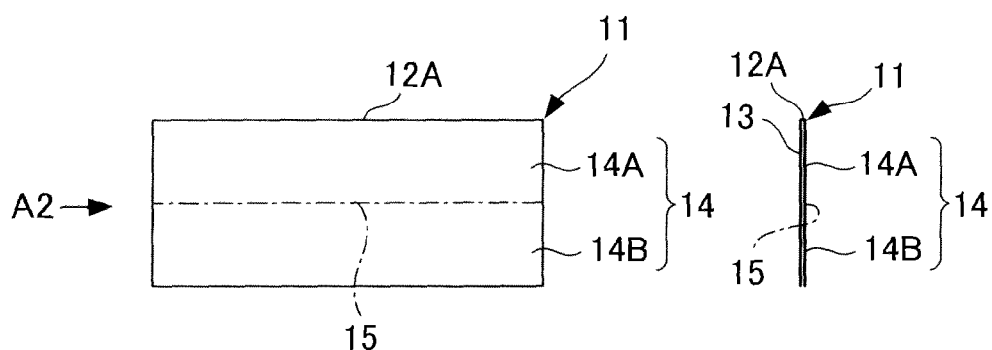
Figures 1E, 1F:
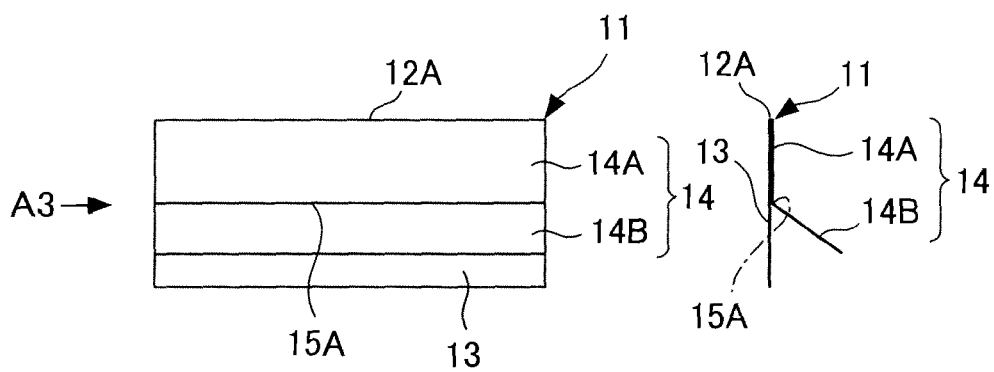
Figure 2A:
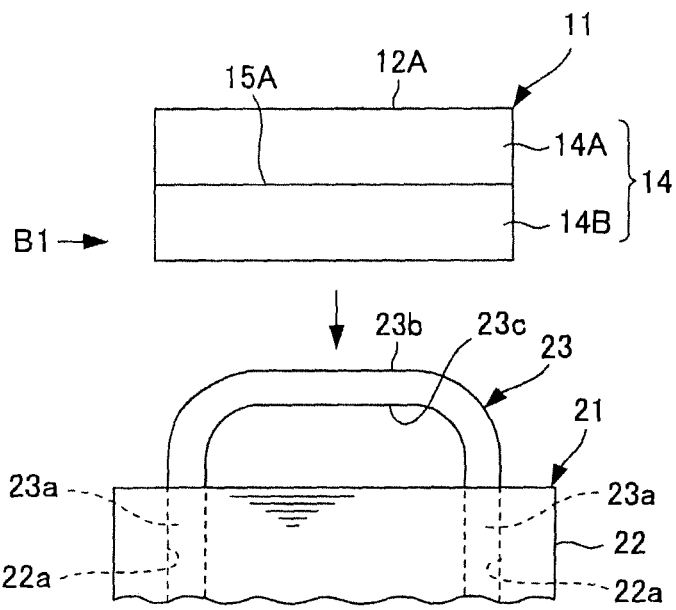
FIG. 2 Part (a) is a front view showing a state where the inter-phase insulation paper sheet for a three-phase AC motor according to Embodiment 1 of the present invention is about to be inserted between coil ends of different phases. Part (b) is a side view seen in the direction of arrow B1 in Part (a). Part (c) is a front view showing a state where the inter-phase insulation paper sheet is inserted between the coil ends of the different phases. Part (d) is a side view seen in the direction of arrow B2 in Part (c). Part (e) is a cross-sectional view taken along line B3-B3 in Part (c) and seen in the direction of arrows B3 in Part (c).
Figure 2B:
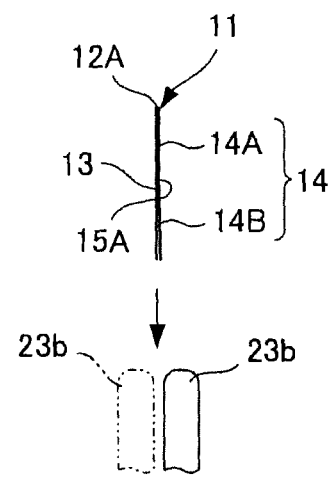
Figure 2C:
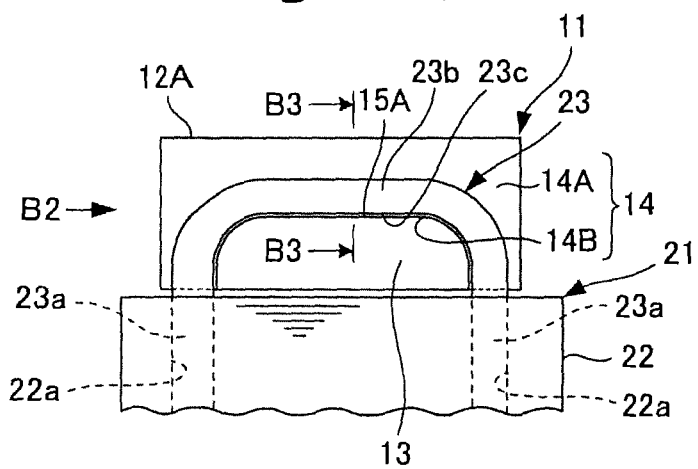
Figure 2D:
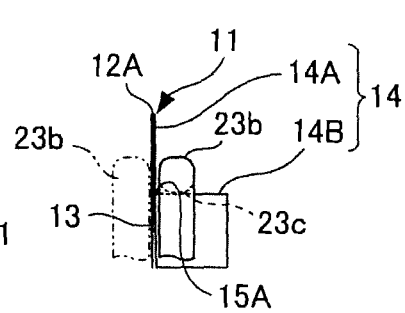
Figure 2E:
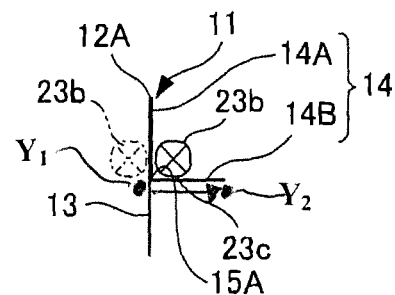
Figure 4A:
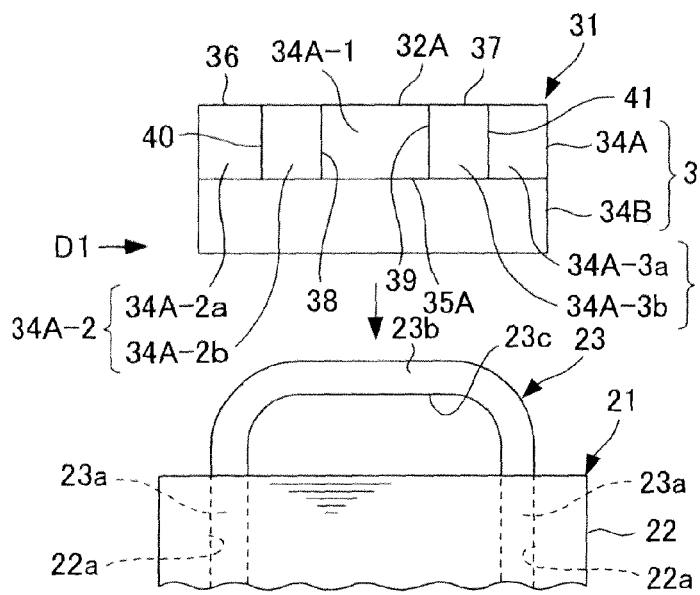
FIG. 4 Part (a) is a front view showing a state where the inter-phase insulation paper sheet for a three-phase AC motor according to Embodiment 2 of the present invention is about to be inserted between coil ends of different phases. Part (b) is a side view seen in the direction of arrow D1 in Part (a). Part (c) is a front view showing a state where the inter-phase insulation paper sheet is inserted between the coil ends of the different phases. Part (d) is a side view seen in the direction of arrow D2 in Part (c). Part (e) is a cross-sectional view taken along line D3-D3 in Part (c) and seen in the direction of arrows D3 in Part (c).
Figure 4B:
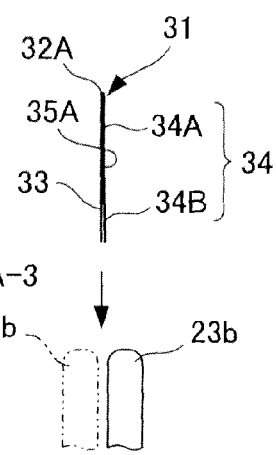
Figure 4C:
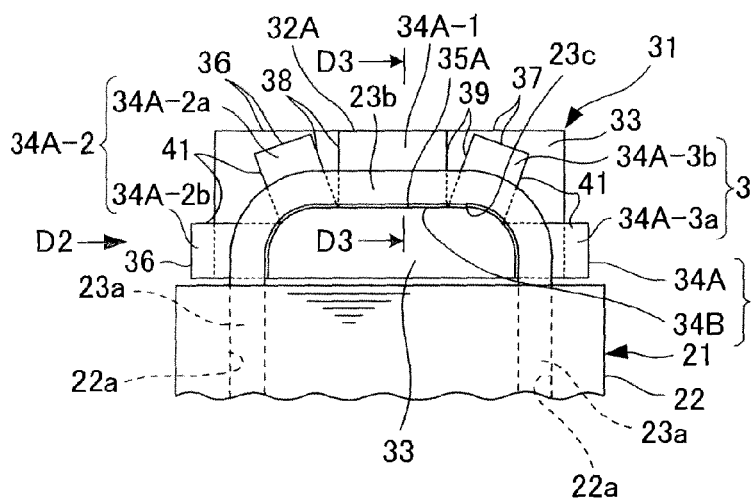
Figure 4D:
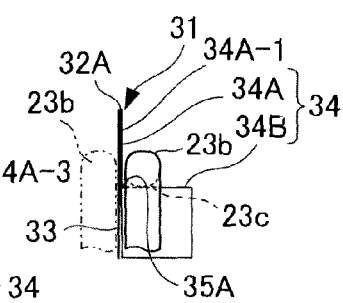
Figure 4E:
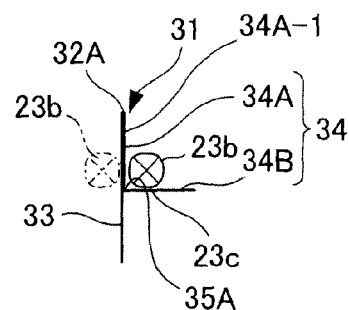
Figure 8A:
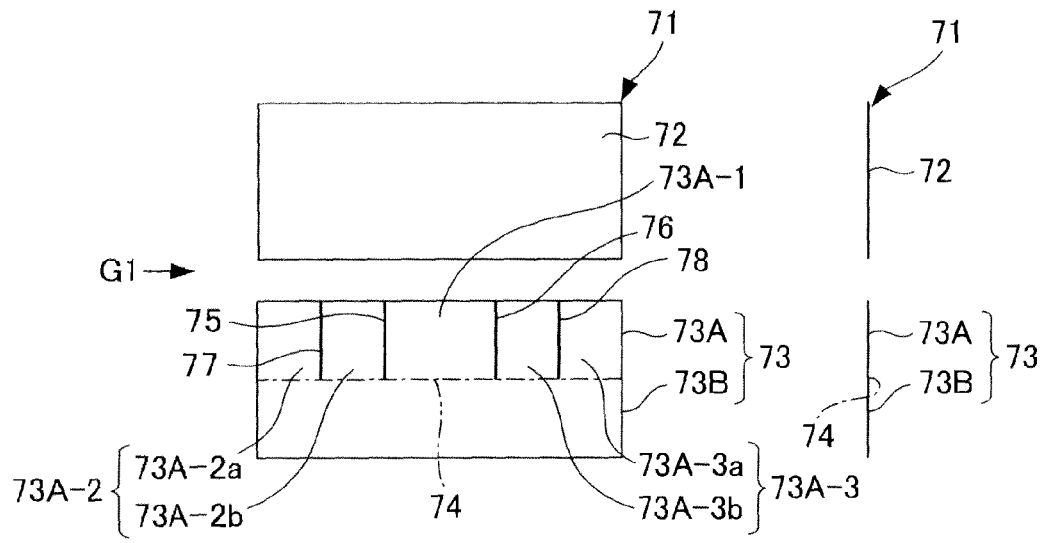
FIG. 8 Part (a) is a front view showing a state before a fixed portion and a movable portion of an inter-phase insulation paper sheet for a three-phase AC motor according to Embodiment 4 of the present invention are set to overlap each other. Part (b) is a side view seen in the direction of arrow G1 in Part (a). Part (c) is a front view showing a state where the fixed portion and the movable portion of the inter-phase insulation paper sheet are set to overlap each other. Part (d) is a side view seen in the direction of arrow G2 in Part (c). Part (e) is a front view showing a state where a collar portion of the inter-phase insulation paper sheet is folded. Part (f) is a cross-sectional view taken along line G3-G3 in Part (e) and seen in the direction of arrows G3 in Part (e).
Figure 8B:
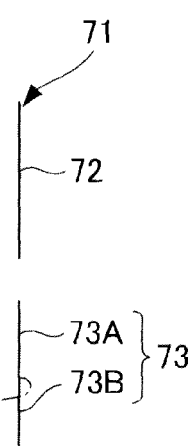
Figure 8C:
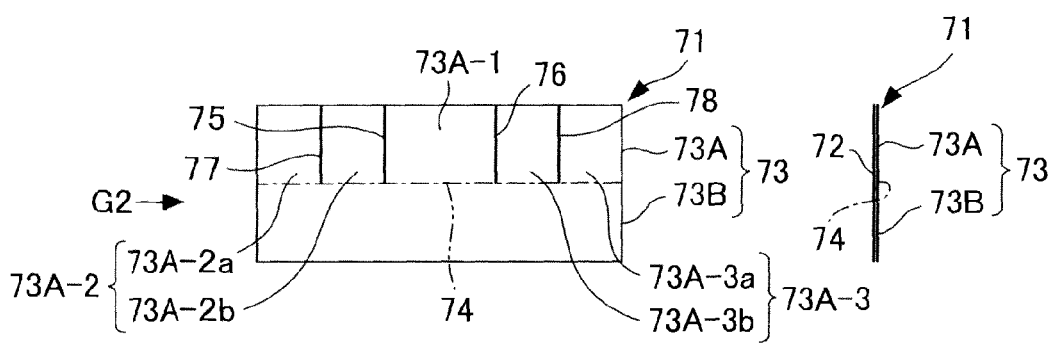
Figure 8D:
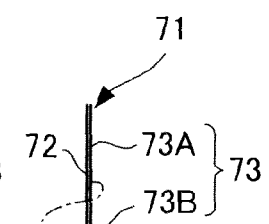
Figure 8E:
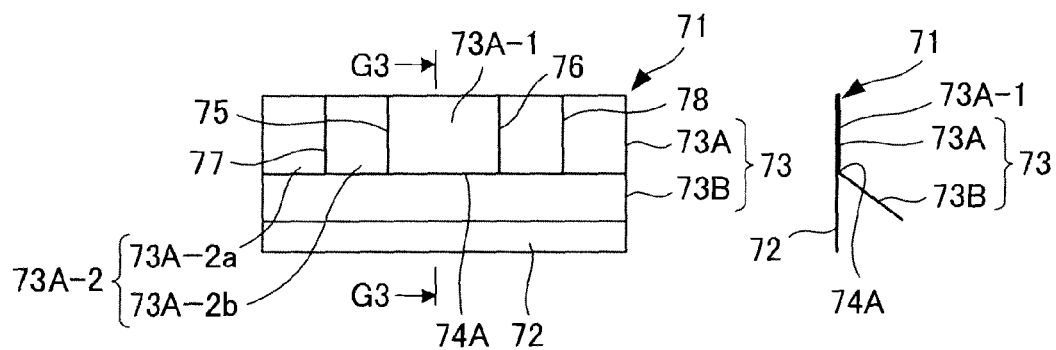
Figure 8F:
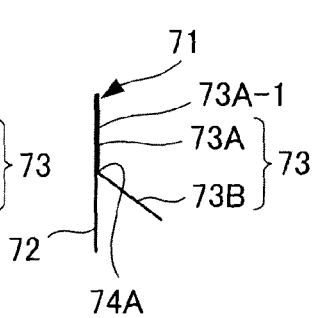

As shown in Parts (c) and (d) of FIG. 1, the inter-phase insulation paper sheet 11 is folded (mountain folded) along the fold line 12, so that the fixed portion 13 and the movable portion 14 are set in an overlapping state. Reference numeral 12A in the drawings denotes the crease created by folding the inter-phase insulation paper sheet 11 along the fold line 12.

Further, as shown in Parts (e) and (f) of FIG. 1, the base portion 14A of the movable portion 14 is fixed to the fixed portion 13 by use of fixing means such as adhesive, insulating tape, double-sided tape, or thermal welding, while the collar portion 14B of the movable portion 14 is folded (valley folded) along the fold line 15 to be in a state of being away from the fixed portion 13. Reference numeral 15A in the drawings denotes the crease created by folding the inter-phase insulation paper sheet 11 along the fold line 15. Note that since the inter-phase insulation paper sheet 11 has the fixed portion 13 and the movable portion 14 integral with each other, the base portion 14A of the movable portion 14 may simply be folded over the fixed portion 13, instead of being fixed to the fixed portion 13 by use of the above-mentioned fixing means.

Next, insertion of the inter-phase insulation paper sheet 11 between coil ends 23b of different phases will be described based on Parts (a) to (e) of FIG. 2.

As shown in Part (a) of FIG. 2, a stator 21 of a three-phase AC motor includes a stator core 22 and coils 23 with three-phase windings fitted in slots 22a in the stator core 22. The coil 23 of each phase includes: a part being a coil side 23a inserted in the corresponding slot 22a; and a part being a coil end 23b situated outside the slot 22a. Moreover, in Embodiment 1, in order to provide insulation between the adjacent coil ends 23b of different phases in the stator 21, the inter-phase insulation paper sheet 11 is inserted between these coil ends 23b.

As shown in Parts (a) and (b) of FIG. 2, to insert the inter-phase insulation paper sheet 11 between the adjacent coil ends 23b of different phases, the inter-phase insulation paper sheet 11 is folded along the fold line 12 (crease 12A) to make the fixed portion 13 and the movable portion 14 overlap each other, and further the base portion 14A is fixed to the fixed portion 13 by use of the above-mentioned fixing means (here, the base portion 14A may not be fixed, as mentioned above). Moreover, the collar portion 14B is folded along the fold line 15 to create the crease 15A, and is then unfolded. This is because it is difficult to insert the inter-phase insulation paper sheet 11 between the coil ends 23b with the collar portion 14B being folded. Thus, at the time of the insertion, the entire movable portion 14 (the base portion 14A and the collar portion 14B) is set to overlap the fixed portion 13 to make the inter-phase insulation paper sheet 11 thin.

Thereafter, the inter-phase insulation paper sheet 11 in this overlapping state is inserted between the coil ends 23b of the different phases.

As shown in Parts (c) to (e) of FIG. 2, once the inter-phase insulation paper sheet 11 is inserted between the coil ends 23b, the collar portion 14B is drawn out of the insulation-paper-sheet insertion side $Y_1$ of one of the coil ends 23b of the different phases (the side where the fixed portion 13 and the base portion 14A are inserted) to the opposite insulation-paper-sheet insertion side $Y_2$ of the one coil end 23b (the opposite side to the insulation-paper-sheet insertion side) through an inner side 23c of the one coil end 23b. Specifically, in this step, the inter-phase insulation paper sheet 11 is in a state where the fixed portion 13 and the base portion 14A overlap each other and are inserted between the coil ends 23b of the different phases while the collar portion 14B is drawn out of the insulation-paper-sheet insertion side of one of the coil ends 23b to the opposite insulation-paper-sheet insertion side of the one coil end 23b through the inner side 23c of the one coil end 23b.

Thereafter, though not illustrated, the fixed portion 13 and the movable portion 14 (the base portion 14A and the collar portion 14B) of the inter-phase insulation paper sheet 11 are fixed to the coil ends 23b by, for example, being tied thereto with a lace (lacing).

Note that the fixed portion 13 is not limited to the rectangular shape shown in the illustrated example and may be in any shape. For example, the fixed portion 13 may be formed in a shape that fits better into the shapes of the coil ends 23b by cutting off a center portion of a given side and corners. Moreover, the collar portion 14B is not limited to the rectangular shape shown in the illustrated example and may be in any shape. For example, the collar portion 14B may be in a trapezoidal shape or the like.

As described above, the inter-phase insulation paper sheet 11 of Embodiment 1 is an inter-phase insulation paper sheet 11 configured to be inserted between the coil ends 23b of different phases provided to the stator core 22 so as to provide insulation between the coil ends 23b of the different phases, characterized in that: the inter-phase insulation paper sheet 11 includes the fixed portion 13 and the movable portion 14; the movable portion 14 has the base portion 14A on one end side and the collar portion 14B on the other end side; and the fixed portion 13 and the base portion 14A overlap each other and are inserted between the coil ends 23b of the different phases while the collar portion 14B is drawn out of the insulation-paper-sheet insertion side of one of the coil ends 23b of the different phases to the opposite insulation-paper-sheet insertion side of the one coil end 23b through the inner side 23c of the one coil end 23b. Thus, the following operations and effects can be achieved.

(1) The inter-phase insulation paper sheet 11 can be inserted between the coil ends 23b of different phases with the fixed portion 13 and the movable portion 14 overlapping each other. Here, the fixed portion 13 and the movable portion 14 simply overlap each other and can therefore be easily inserted between the coil ends 23b. Moreover, since the fixed portion 13 and the movable portion 14 overlap each other, the inter-phase insulation paper sheet 11 can secure its thickness. Accordingly, the insertability of the inter-phase insulation paper sheet 11 between the coil ends 23b can be further improved.

(2) Moreover, since the fixed portion 13 and the movable portion 14 overlap each other, the inter-phase insulation paper sheet 11 is less likely to be torn during the lacing and the like.

(3) Furthermore, since the collar portion 14B is drawn out of the insulation-paper-sheet insertion side of one of the coil ends 23b to the opposite insulation-paper-sheet insertion side of the one coil end 23b through the inner side 23c of the one coil end 23b, the collar portion 14B is caught on the coil end 23b and thus prevents displacement of the inter-phase insulation paper sheet 11. Accordingly, displacement of the inter-phase insulation paper sheet 11 is less likely to occur during manufacturing operations such as the coil shaping and the lacing, and therefore the insulation between the coil ends 23b can be secured.

Moreover, the inter-phase insulation paper sheet 11 of Embodiment 1 is characterized in that the fixed portion 13 and the movable portion 14 are integral with each other. Thus, the movable portion 14 does not need to be fixed to the fixed portion 13 by use of fixing means; the movable portion 14 only needs to be folded over the fixed portion 13. Accordingly, the operation of preparing the inter-phase insulation paper sheet 11 is easy.

Embodiment 2

First, the configuration of an inter-phase insulation paper sheet 31 for a three-phase AC motor according to Embodiment 2 of the present invention will be described based on Parts (a) to (f) of FIG. 3.

As shown in Parts (a) and (b) of FIG. 3, the inter-phase insulation paper sheet 31 of Embodiment 2 is a single rectangular sheet, and a side thereof above a center fold line (an imaginary line: the line may be an actually drawn line) 32 (one end side) is a fixed portion 33 while a side thereof below the fold line 32 (the other end side) is a movable portion 34. That is, the inter-phase insulation paper sheet 31 has the fixed portion 33 and the movable portion 34 integral with each other. Moreover, a side of the movable portion 34 above a center fold line (an imaginary line: the line may be an actually drawn line) 35 (one end side) is a base portion 34A while a side thereof below the fold line 35 (the other end side) is a collar portion 34B.

Further, in the inter-phase insulation paper sheet 31 of Embodiment 2, slits 36 and 37 extending in a width direction (the width direction of the inter-phase insulation paper sheet 31: the horizontal direction in Part (a) of FIG. 3) are provided between the fixed portion 33 and the base portion 34A of the movable portion 34 on both sides in the width direction. For this reason, the base portion 34A is shaped to have a center portion 34A-1 which is connected to the fixed portion 33 and side portions 34A-2 and 34A-3 which are separated from the fixed portion 33. Moreover, slits 38 and 39 extending in a longitudinal direction (the longitudinal direction of the inter-phase insulation paper sheet 31: the vertical direction in Part (a) of FIG. 3) are provided between the center portion 34A-1 and the side portions 34A-2 and 34A-3 of the base portion 34A. That is, the side portions 34A-2 and 34A-3 are separated from the fixed portion 33 in the longitudinal direction by the slits 36 and 37, and also separated from the center portion 34A-1 in the width direction by the slits 38 and 39.

Further, the side portion 34A-2 is provided with a slit 40 extending in the longitudinal direction and thereby split into two portions, or a first split portion 34A-2a and a second split portion 34A-2b. Likewise, the side portion 34A-3 is provided with a slit 41 extending in the longitudinal direction and thereby split into two portions, or a first split portion 34A-3a and a second split portion 34A-3b. Note that each of the side portions 34A-2 and 34A-3 can be split not only into two portions but also into three or more portions by providing them with two or more slits extending in the longitudinal direction.

As shown in Parts (c) and (d) of FIG. 3, the inter-phase insulation paper sheet 31 is folded (mountain folded) along the fold line 32, so that the fixed portion 33 and the movable portion 34 are set in an overlapping state. Reference numeral 32A in the drawings denotes the crease created by folding the inter-phase insulation paper sheet 31 along the fold line 32.

Further, as shown in Parts (e) and (f) of FIG. 3, the center portion 34A-1 of the base portion 34A of the movable portion 34 is fixed to the fixed portion 33 by use of fixing means such as adhesive, insulating tape, double-sided tape, or thermal welding, while the collar portion 34B of the movable portion 34 is folded (valley folded) along the fold line 35 to be in a state of being away from the fixed portion 33. Reference numeral 35A in the drawings denotes the crease created by folding the inter-phase insulation paper sheet 31 along the fold line 35. Note that since the inter-phase insulation paper sheet 31 has the fixed portion 33 and the movable portion 34 integral with each other, the center portion 34A-1 of the base portion 34A may simply be folded over the fixed portion 33, instead of being fixed to the fixed portion 33 by use of the above-mentioned fixing means.

Next, insertion of the inter-phase insulation paper sheet 31 between coil ends 23b of different phases will be described based on Parts (a) to (e) of FIG. 4.

The configuration of a stator 21 of a three-phase AC motor shown in Part (a) of FIG. 4 is the same as that of the stator 21 of the three-phase AC motor shown in Part (a) of FIG. 2 mentioned earlier, and thus specific description thereof is omitted here. Moreover, in Embodiment 2, in order to provide insulation between the adjacent coil ends 23b of different phases in the stator 21, the inter-phase insulation paper sheet 31 is inserted between these coil ends 23b.

As shown in Parts (a) and (b) of FIG. 4, to insert the inter-phase insulation paper sheet 31 between the adjacent coil ends 23b of different phases, the inter-phase insulation paper sheet 31 is folded along the fold line 32 (crease 32A) to make the fixed portion 33 and the movable portion 34 overlap each other, and further the center portion 34A-1 of the base portion 34A is fixed to the fixed portion 33 by use of the above-mentioned fixing means (here, the center portion 34A-1 may not be fixed, as mentioned above). Moreover, the collar portion 34B is folded along the fold line 35 to create the crease 35A, and is then unfolded. This is because it is difficult to insert the inter-phase insulation paper sheet 31 between the coil ends 23b with the collar portion 34B being folded. Thus, at the time of the insertion, the entire movable portion 34 (the base portion 34A and the collar portion 34B) is set to overlap the fixed portion 33 to make the inter-phase insulation paper sheet 31 thin.

Thereafter, the inter-phase insulation paper sheet 31 in this overlapping state is inserted between the coil ends 23b of the different phases.

As shown in Parts (c) to (e) of FIG. 4, once the inter-phase insulation paper sheet 31 is inserted between the coil ends 23b, the collar portion 34B is drawn out of the insulation-paper-sheet insertion side of one of the coil ends 23b of the different phases (the side where the fixed portion 33 and the base portion 34A are inserted) to the opposite insulation-paper-sheet insertion side of the one coil end 23b (the opposite side to the insulation-paper-sheet insertion side)

through an inner side 23c of the one coil end 23b. Specifically, in this step, the inter-phase insulation paper sheet 31 is in a state where the fixed portion 33 and the base portion 34A overlap each other and are inserted between the coil ends 23b of the different phases while the collar portion 34 is drawn out of the insulation-paper-sheet insertion side of one of the coil ends 23b to the opposite insulation-paper-sheet insertion side of the one coil end 23b through the inner side 23c of the one coil end 23b.

Meanwhile, when the collar portion 34B is drawn out from the inner side 23c of the coil end 23b and curved along the curved shape of the inner side 23c of the coil end 23b, the base portion 34A is accordingly deformed such that the center portion 34A-1 and each of the first split portion 34A-2a and second split portion 34A-2b of the side portion 34A-2 and the first split portion 34A-3a and second split portion 34A-3b of the side portion 34A-3 are set in a state of spreading out in a V shape (a fan shape).

Thereafter, though not illustrated, the fixed portion 33 and the movable portion 34 (the base portion 34A and the collar portion 34B) of the inter-phase insulation paper sheet 31 are fixed to the coil ends 23b by, for example, being tied thereto with a lace (lacing).

Note that the fixed portion 33 is not limited to the rectangular shape shown in the illustrated example and may be in any shape. For example, the fixed portion 33 may be formed in a shape that fits better into the shapes of the coil ends 23b by cutting off a center portion of a given side and corners. Moreover, the collar portion 34B is not limited to the rectangular shape shown in the illustrated example and may be in any shape. For example, the collar portion 34B may be in a trapezoidal shape or the like.

As described above, the inter-phase insulation paper sheet 31 of Embodiment 2 is an inter-phase insulation paper sheet 31 configured to be inserted between the coil ends 23b of different phases provided to the stator core 22 so as to provide insulation between the coil ends 23b of the different phases, characterized in that: the inter-phase insulation paper sheet 31 includes the fixed portion 33 and the movable portion 34; the movable portion 34 has the base portion 34A on one end side and the collar portion 34B on the other end side; the fixed portion 33 and the base portion 34A overlap each other and are inserted between the coil ends 23b of the different phases while the collar portion 34B is drawn out of the insulation-paper-sheet insertion side of one of the coil ends 23b of the different phases to the opposite insulation-paper-sheet insertion side of the one coil end 23b through the inner side 23c of the one coil end 23b; and the fixed portion 33 and the movable portion 34 are integral with each other. Accordingly, the same operations and effects as the inter-phase insulation paper sheet 11 of Embodiment 1 described above can be achieved.

Further, the inter-phase insulation paper sheet 31 of Embodiment 2 is characterized in that: the slits 36 and 37 extending the width direction are provided between the fixed portion 33 and the base portion 34A of the movable portion 34 on both sides in the width direction, so that the base portion 34A is shaped to have the center portion 34A-1 which is connected to the fixed portion 33 and the side portions 34A-2 and 34A-3 which are separated from the fixed portion 33; the slits 38 and 39 extending in the longitudinal direction are provided between the center portion 34A-1 and the side portions 34A-2 and 34A-3 of the base portion 34A; and the center portion 34A-1 and each of the side portions 34A-2 and 34A-3 are in a state of spreading out in a V shape. Thus, the following operations and effects can be achieved.

(1) When the collar portion 34B is drawn out of the insulation-paper-sheet insertion side of the coil end 23b to the opposite insulation-paper-sheet insertion side thereof, the center portion 34A-1 and each of the side portions 34A-2 and 34A-3 of the base portion 34A of the movable portion 34 spread out in a V shape (a fan shape). Accordingly, the operation of drawing out the collar portion 34A can be done easily.

(2) The center portion 34A-1 of the base portion 34A and the fixed portion 33 remain unmoved even when the side portions 34A-2 and 34A-3 of the base portion 34A and the collar portion 34B of the movable portion 34 are moved during the coil shaping, the lacing, and the like. Accordingly, the insulation between the coil ends 23b can be secured.

(3) The side portions 34A-2 and 34A-3 of the base portion 34A and the collar portion 34B of the movable portion 34 are freely movable. Accordingly, the insulation between the coil ends 23b can be secured even when the shapes of the coil ends 23b are uneven.

In addition, the inter-phase insulation paper sheet 31 of Embodiment 2 is characterized in that: the side portions 34A-2 and 34A-3 of the base portion 34A are provided with the slits 40 and 41 extending in the longitudinal direction to be split into two portions; and each of these split portions 34A-2a, 34A-2b, 34A-3a, and 34A-3b and the center portion 34A-1 are in a state of spreading out in a V shape. This is more effective than the case of not splitting the side portions 34A-2 and 34A-3.

Embodiment 3

First, the configuration of an inter-phase insulation paper sheet 51 for a three-phase AC motor according to Embodiment 3 of the present invention will be described based on Parts (a) to (f) of FIG. 5.

As shown in Parts (a) and (b) of FIG. 5, the inter-phase insulation paper sheet 51 of Embodiment 3 is a single rectangular sheet, and a side thereof above a center fold line (an imaginary line: the line may be an actually drawn line) 52 (one end side) is a fixed portion 53 while a side thereof below the fold line 52 (the other end side) is a movable portion 54. That is, the inter-phase insulation paper sheet 51 has the fixed portion 53 and the movable portion 54 integral with each other. Moreover, a side of the movable portion 54 above a center fold line (an imaginary line: the line may be an actually drawn line) 55 (one end side) is a base portion 54A while a side thereof below the fold line 55 (the other end side) is a collar portion 54B.

Moreover, slits 56 and 57 extending in a width direction (the width direction of the inter-phase insulation paper sheet 51: the horizontal direction in Part (a) of FIG. 5) are provided between the fixed portion 53 and the base portion 54A of the movable portion 54 on both sides in the width direction. For this reason, the base portion 54A is shaped to have a center portion 54A-1 which is connected to the fixed portion 53 and side portions 54A-2 and 54A-3 which are separated from the fixed portion 53. Moreover, slits 58 and 59 extending in a longitudinal direction (the longitudinal direction of the inter-phase insulation paper sheet 51: the vertical direction in Part (a) of FIG. 5) are provided between the center portion 54A-1 and the side portions 54A-2 and 54A-3 of the base portion 54A. That is, the side portions 54A-2 and 54A-3 are separated from the fixed portion 53 in the longitudinal direction by the slits 56 and 57, and also separated from the center portion 54A-1 in the width direction by the slits 58 and 59.

Further, the side portion 54A-2 is provided with a slit 60 extending in the longitudinal direction and thereby split into two portions, or a first split portion 54A-2*a* and a second split portion 54A-2*b*. Likewise, the side portion 54A-3 is provided with a slit 61 extending in the longitudinal direction and thereby split into two portions, or a first split portion 54A-3*a* and a second split portion 54A-3*b*. Note that each of the side portions 54A-2 and 54A-3 can be split not only into two portions but also into three or more portions by providing them with two or more slits extending in the longitudinal direction.

Furthermore, the inter-phase insulation paper sheet 51 of Embodiment 3 has a triangular protrusion 62 given to the collar portion 54B.

As shown in Parts (c) and (d) of FIG. 5, the inter-phase insulation paper sheet 51 is folded (mountain folded) along the fold line 52, so that the fixed portion 53 and the movable portion 54 are set in an overlapping state. Reference numeral 52A in the drawings denotes the crease created by folding the inter-phase insulation paper sheet 51 along the fold line 52.

Further, as shown in Parts (e) and (f) of FIG. 5, the center portion 54A-1 of the base portion 54A of the movable portion 54 is fixed to the fixed portion 53 by use of fixing means such as adhesive, insulating tape, double-sided tape, or thermal welding, while the collar portion 54B of the movable portion 54 is folded (valley folded) along the fold line 55 to be in a state of being away from the fixed portion 53. Reference numeral 55A in the drawings denotes the crease created by folding the inter-phase insulation paper sheet 51 along the fold line 55. Note that since the inter-phase insulation paper sheet 51 has the fixed portion 53 and the movable portion 54 integral with each other, the center portion 54A-1 of the base portion 54A may simply be folded over the fixed portion 53, instead of being fixed to the fixed portion 53 by use of the above-mentioned fixing means.

Next, insertion of the inter-phase insulation paper sheet 51 between coil ends 23*b* of different phases will be described based on Parts (a) to (e) of FIG. 6.

The configuration of a stator 21 of a three-phase AC motor shown in Part (a) of FIG. 6 is the same as that of the stator 21 of the three-phase AC motor shown in Part (a) of FIG. 2 mentioned earlier, and thus specific description thereof is omitted here. Moreover, in Embodiment 3, in order to provide insulation between the adjacent coil ends 23*b* of different phases in the stator 21, the inter-phase insulation paper sheet 51 is inserted between these coil ends 23*b*.

As shown in Parts (a) and (b) of FIG. 6, to insert the inter-phase insulation paper sheet 51 between the adjacent coil ends 23*b* of different phases, the inter-phase insulation paper sheet 51 is folded along the fold line 52 (crease 52A) to make the fixed portion 53 and the movable portion 54 overlap each other, and further the center portion 54A-1 of the base portion 54A is fixed to the fixed portion 53 by use of the above-mentioned fixing means (here, the center portion 54A-1 may not be fixed, as mentioned above). Moreover, the collar portion 54B and the protrusion 62 are folded along the fold line 55 to create the crease 55A, and are then unfolded. This is because it is difficult to insert the inter-phase insulation paper sheet 51 between the coil ends 23*b* with the collar portion 54B and the protrusion 62 being folded. Thus, at the time of the insertion, the entire movable portion 54 (the base portion 54A, the collar portion 54B, and the protrusion 62) is set to overlap the fixed portion 53 to make the inter-phase insulation paper sheet 51 thin.

Thereafter, the inter-phase insulation paper sheet 51 in this overlapping state is inserted between the coil ends 23*b* of the different phases.

As shown in Parts (c) to (e) of FIG. 6, once the inter-phase insulation paper sheet 51 is inserted between the coil ends 23*b*, the collar portion 54B and the protrusion 62 are drawn out of the insulation-paper-sheet insertion side of one of the coil ends 23*b* of the different phases (the side where the fixed portion 53 and the base portion 54A are inserted) to the opposite insulation-paper-sheet insertion side of the one coil end 23*b* (the opposite side to the insulation-paper-sheet insertion side) through an inner side 23*c* of the one coil end 23*b*. Specifically, in this step, the inter-phase insulation paper sheet 51 is in a state where the fixed portion 53 and the base portion 54A overlap each other and are inserted between the coil ends 23*b* of the different phases while the collar portion 54B and the protrusion 62 are drawn out of the insulation-paper-sheet insertion side of one of the coil ends 23*b* to the opposite insulation-paper-sheet insertion side of the one coil end 23*b* through the inner side 23*c* of the one coil end 23*b*. Here, in this step, the operator can easily draw out the collar portion 54B by holding the protrusion 62.

Meanwhile, when the collar portion 54B is drawn out from the inner side 23*c* of the coil end 23*b* and curved along the curved shape of the inner side 23*c* of the coil end 23*b*, the base portion 54A is accordingly deformed such that the center portion 54A-1 and each of the first split portion 54A-2*a* and second split portion 54A-2*b* of the side portion 54A-2 and the first split portion 54A-3*a* and second split portion 54A-3*b* of the side portion 54A-3 are set in a state of spreading out in a V shape (a fan shape).

Thereafter, though not illustrated, the fixed portion 53 and the movable portion 54 (the base portion 54A, the collar portion 54B, and the protrusion 62) of the inter-phase insulation paper sheet 51 are fixed to the coil ends 23*b* by, for example, being tied thereto with a lace (lacing).

Here, the protrusion 62 is not limited to the triangular shape as mentioned above and may be in any shape. For example, a rectangular protrusion 62 may be given to the collar portion 54B as shown in FIG. 7.

Moreover, the fixed portion 53 is not limited to the rectangular shape shown in the illustrated example and may be in any shape. For example, the fixed portion 53 may be formed in a shape that fits better into the shapes of the coil ends 23*b* by cutting off a center portion of a given side and corners. Moreover, the collar portion 54B is not limited to the rectangular shape shown in the illustrated example and may be in any shape. For example, the collar portion 54B may be in a trapezoidal shape or the like.

As described above, the inter-phase insulation paper sheet 51 of Embodiment 3 is an inter-phase insulation paper sheet 51 configured to be inserted between the coil ends 23*b* of different phases provided to the stator core 22 so as to provide insulation between the coil ends 23*b* of the different phases, characterized in that: the inter-phase insulation paper sheet 51 includes the fixed portion 53 and the movable portion 54; the movable portion 54 has the base portion 54A on one end side and the collar portion 54B on the other end side; the fixed portion 53 and the base portion 54A overlap each other and are inserted between the coil ends 23*b* of the different phases while the collar portion 54B is drawn out of the insulation-paper-sheet insertion side of one of the coil ends 23*b* of the different phases to the opposite insulation-paper-sheet insertion side of the one coil end 23*b* through the inner side 23*c* of the one coil end 23*b*; and the fixed portion 53 and the movable portion 54 are integral with each other.

Accordingly, the same operations and effects as the inter-phase insulation paper sheet 11 of Embodiment 1 described above can be achieved.

Moreover, the inter-phase insulation paper sheet 51 of Embodiment 3 is characterized in that: the slits 56 and 57 extending the width direction are provided between the fixed portion 53 and the base portion 54A of the movable portion 54 on both sides in the width direction, so that the base portion 54A is shaped to have the center portion 54A-1 which is connected to the fixed portion 53 and the side portions 54A-2 and 54A-3 which are separated from the fixed portion 53; the slits 58 and 59 extending in the longitudinal direction are provided between the center portion 54A-1 and the side portions 54A-2 and 54A-3 of the base portion 54A; the center portion 54A-1 and each of the side portions 54A-2 and 54A-3 are in a state of spreading out in a V shape; the side portions 54A-2 and 54A-3 of the base portion 54A are provided with the slits 60 and 61 extending in the longitudinal direction to be split into two portions; and each of these split portions 54A-2a, 54A-2b, 54A-3a, and the 54A-3b and the center portion 54A-1 are in a state of spreading out in a V shape. Accordingly, the same operations and effects as the inter-phase insulation paper sheet 31 of Embodiment 2 described above can be achieved.

Furthermore, the inter-phase insulation paper sheet 51 of Embodiment 3 is characterized in that the protrusion 62 is given to the collar portion 54B of the movable portion 54. Thus, when the collar portion 54B is to be drawn out of the insulation-paper-sheet insertion side of one of the coil ends 23b to the opposite insulation-paper-sheet insertion side of the one coil end 23b through the inner side 23c of the one coil end 23b, the operator can draw out the collar portion 54B by holding the protrusion 62. Accordingly, the operation of drawing out the collar portion 54B can be made easier.

Embodiment 4

The configuration of an inter-phase insulation paper sheet 71 for a three-phase AC motor according to Embodiment 4 of the present invention will be described based on Parts (a) to (f) of FIG. 8.

As shown in Parts (a) and (b) of FIG. 8, a fixed portion 72 and a movable portion 73 of the inter-phase insulation paper sheet 71 of Embodiment 4 are separate bodies divided and shaped individually.

A side of the movable portion 73 above a center fold line (an imaginary line: the line may be an actually drawn line) 74 (one end side) is a base portion 73A while a side thereof below the fold line 74 (the other end side) is a collar portion 73B. Moreover, slits 75 and 76 extending in a longitudinal direction (the longitudinal direction of the movable portion 73: the vertical direction in Part (a) of FIG. 8) are provided between a center portion 73A-1 and side portions 73A-2 and 73A-3 of the base portion 73A. That is, the side portions 73A-2 and 73A-3 are separated from the center portion 73A-1 in the width direction by the slits 75 and 76.

Further, the side portion 73A-2 is provided with a slit 77 extending in the longitudinal direction and thereby split into two portions, or a first split portion 73A-2a and a second split portion 73A-2b. Likewise, the side portion 73A-3 is provided with a slit 78 extending in the longitudinal direction and thereby split into two portions, or a first split portion 73A-3a and a second split portion 73A-3b. Note that each of the side portions 73A-2 and 73A-3 can be split not only into two portions but also into three or more portions by providing them with two or more slits extending in the longitudinal direction.

Incidentally, though not illustrated, a protrusion may be given to the collar portion 73B as in Embodiment 3 described above. Moreover, the fixed portion 72 is not limited to the rectangular shape shown in the illustrated example and may be in any shape. For example, the fixed portion 72 may be formed in a shape that fits better into the shapes of coil ends by cutting off a center portion of a given side and corners. Moreover, the collar portion 73B is not limited to the rectangular shape shown in the illustrated example and may be in any shape. For example, the collar portion 73B may be in a trapezoidal shape or the like.

As shown in Parts (c) and (d) of FIG. 8, the inter-phase insulation paper sheet 71 is set in a state where the fixed portion 72 and the movable portion 73 being separate bodies overlap each other. Further, as shown in Parts (e) and (f) of FIG. 8, the center portion 73A-1 of the base portion 73A of the movable portion 73 is fixed to the fixed portion 72 by use of fixing means such as adhesive, insulating tape, double-sided tape, or thermal welding, while the collar portion 73B of the movable portion 73 is folded (valley folded) along the fold line 74 to be in a state of being away from the fixed portion 72. Reference numeral 74A in the drawings denotes the crease created by folding the movable portion 73 along the fold line 74.

Insertion of the inter-phase insulation paper sheet 71 between coil ends of different phases is done in the same manner as Embodiments 2 and 3 described above (see Parts (a) to (e) of FIG. 4 and Parts (a) to (e) of FIG. 6), except that the fixed portion 72 and the movable portion 73 (the center portion 73A-1 of the base portion 73A) being separate bodies are fixed to each other by use of the above-mentioned fixing means to overlap each other. Thus, specific description and illustration thereof are omitted here.

As described above, the inter-phase insulation paper sheet 71 of Embodiment 4 is an inter-phase insulation paper sheet 71 configured to be inserted between the coil ends 23b of different phases provided to the stator core 22 so as to provide insulation between the coil ends 23b of the different phases, characterized in that: the inter-phase insulation paper sheet 71 includes the fixed portion 72 and the movable portion 73; the movable portion 73 has the base portion 73A on one end side and the collar portion 73B on the other end side; and the fixed portion 72 and the base portion 73A overlap each other and are inserted between the coil ends 23b of the different phases while the collar portion 73B is drawn out of the insulation-paper-sheet insertion side of one of the coil ends 23b of the different phases to the opposite insulation-paper-sheet insertion side of the one coil end 23b through the inner side 23c of the one coil end 23b. Accordingly, the same operations and effects as the inter-phase insulation paper sheet 11 of Embodiment 1 described above can be achieved.

Moreover, the inter-phase insulation paper sheet 71 of Embodiment 4 is characterized in that: slits extending the width direction are provided between the fixed portion 72 and the base portion 73A of the movable portion 73 on both sides in the width direction, so that the base portion 73A is shaped to have the center portion 73A-1 which is connected to the fixed portion 72 and the side portions 73A-2 and 73A-3 which are separated from the fixed portion 72; the slits 75 and 76 extending in the longitudinal direction are provided between the center portion 73A-1 and the side portions 73A-2 and 73A-3 of the base portion 73A, so that the center portion 73A-1 and each of the side portions 73A-2 and 73A-3 are in a state of spreading out in a V shape; the side portions 73A-2 and 73A-3 of the base portion 73A are provided with the slits 77 and 78 extending in the longitudinal direction to be split into two portions; and each of these split portions 73A-2a, 73A-2b, 73A-3a, and the 73A-3b and the center portion 73A-1 are in a state of spreading out in a V shape. Accordingly, the same operations and effects as the inter-phase insulation paper sheet 31 of Embodiment 2 described above can be achieved.

Furthermore, the inter-phase insulation paper sheet 71 of Embodiment 4 is characterized in that the fixed portion 72 and the movable portion 73 are separate bodies. Thus, the shapes of the fixed portion 72 and the movable portion 73 can be designed freely. Accordingly, the fixed portion 72 and the movable portion 73 can be easily manufactured in shapes that fit into the shapes of the coil ends.

Embodiment 5

The configuration of an inter-phase insulation paper sheet 81 for a three-phase AC motor according to Embodiment 5 of the present invention will be described based on Parts (a) to (f) of FIG. 9.

As shown in Parts (a) and (b) of FIG. 9, a fixed portion 82 and a movable portion 83 of the inter-phase insulation paper sheet 81 of Embodiment 5 are separate bodies divided and shaped individually.

A side of the movable portion 83 above a center fold line (an imaginary line: the line may be an actually drawn line) 84 (one end side) is a base portion 83A while a side thereof below the fold line 84 (the other end side) is a collar portion 83B. Moreover, slits 85 and 86 extending in a longitudinal direction (the longitudinal direction of the movable portion 83: the vertical direction in Part (a) of FIG. 9) are provided between a center portion 83A-1 and side portions 83A-2 and 83A-3 of the base portion 83A. That is, the side portions 83A-2 and 83A-3 are separated from the center portion 83A-1 in the width direction by the slits 85 and 86.

Further, the side portion 83A-2 is provided with a slit 87 extending in the longitudinal direction and thereby split into two portions, or a first split portion 83A-2a and a second split portion 83A-2b. Likewise, the side portion 83A-3 is provided with a slit 88 extending in the longitudinal direction and thereby split into two portions, or a first split portion 83A-3a and a second split portion 83A-3b. Note that each of the side portions 83A-2 and 83A-3 can be split not only into two portions but also into three or more portions by providing them with two or more slits extending in the longitudinal direction.

Moreover, a slit hole 89 extending in a width direction (the width direction of the fixed portion 82: the horizontal direction in Part (a) of FIG. 9) is provided at the center of the fixed portion 82. This slit hole 89 has a length corresponding to the center portion 83A-1 of the base portion 83A of the movable portion 83.

Incidentally, though not illustrated, a protrusion may be given to the collar portion 83B as in Embodiment 3 described above. Moreover, the fixed portion 82 is not limited to the rectangular shape shown in the illustrated example and may be in any shape. For example, the fixed portion 82 may be formed in a shape that fits better into the shapes of coil ends by cutting off a center portion of a given side and corners. Moreover, the collar portion 83B is not limited to the rectangular shape shown in the illustrated example and may be in any shape. For example, the collar portion 83B may be in a trapezoidal shape or the like.

As shown in Parts (c) and (d) of FIG. 9, the inter-phase insulation paper sheet 81 is set in a state where the fixed portion 82 and the movable portion 83 being separate bodies overlap each other. Further, the center portion 83A-1 of the base portion 83A of the movable portion 83 is fixed to the fixed portion 82 by being inserted into the slit hole 89 of the fixed portion 82. Note that in addition to this fixing means, fixing means such as adhesive, insulating tape, double-sided tape, or thermal welding may also be used to fix the center portion 83A-1 of the base portion 83A to the fixed portion 82.

Further, as shown in Parts (e) and (f) of FIG. 9, the collar portion 83B of the movable portion 83 is folded (valley folded) along the fold line 84 to be in a state of being away from the fixed portion 82. Reference numeral 84A in the drawing denotes the crease created by folding the movable portion 83 along the fold line 84.

Insertion of the inter-phase insulation paper sheet 81 between coil ends of different phases is done in the same manner as Embodiments 2 and 3 described above (see Parts (a) to (e) of FIG. 4 and Parts (a) to (e) of FIG. 6), except that the fixed portion 82 and the movable portion 83 being separate bodies are set to overlap each other by inserting the center portion 83A-1 of the base portion 83A of the movable portion 83 into the slit hole 89 of the fixed portion 82. Thus, specific description and illustration thereof are omitted here.

As described above, the inter-phase insulation paper sheet 81 of Embodiment 5 is an inter-phase insulation paper sheet 81 configured to be inserted between the coil ends 23b of different phases provided to the stator core 22 so as to provide insulation between the coil ends 23b of the different phases, characterized in that: the inter-phase insulation paper sheet 81 includes the fixed portion 82 and the movable portion 83; the movable portion 83 has the base portion 83A on one end side and the collar portion 83B on the other end side; and the fixed portion 82 and the base portion 83A overlap each other and are inserted between the coil ends 23b of the different phases while the collar portion 83B is drawn out of the insulation-paper-sheet insertion side of one of the coil ends 23b of the different phases to the opposite insulation-paper-sheet insertion side of the one coil end 23b through the inner side 23c of the one coil end 23b. Accordingly, the same operations and effects as the inter-phase insulation paper sheet 11 of Embodiment 1 described above can be achieved.

Moreover, the inter-phase insulation paper sheet 81 of Embodiment 5 is characterized in that: slits extending the width direction are provided between the fixed portion 82 and the base portion 83A of the movable portion 83 on both sides in the width direction, so that the base portion 83A is shaped to have the center portion 83A-1 which is connected to the fixed portion 82 and the side portions 83A-2 and 83A-3 which are separated from the fixed portion 82; the slits 85 and 86 extending in the longitudinal direction are provided between the center portion 83A-1 and the side portions 83A-2 and 83A-3 of the base portion 83A, so that the center portion 83A-1 and each of the side portions 83A-2 and 83A-3 are in a state of spreading out in a V shape; the side portions 83A-2 and 83A-3 of the base portion 83A are provided with the slits 87 and 88 extending in the longitudinal direction to be split into two portions; and each of these split portions 83A-2a, 83A-2b, 83A-3a, and the 83A-3b and the center portion 83A-1 are in a state of spreading out in a V shape. Accordingly, the same operations and effects as the inter-phase insulation paper sheet 31 of Embodiment 2 described above can be achieved.

Moreover, the inter-phase insulation paper sheet 81 of Embodiment 5 is characterized in that the fixed portion 82 and the movable portion 83 are separate bodies. Accordingly, the same effects and operations as the inter-phase insulation paper sheet 71 of Embodiment 4 described above can be achieved.

Furthermore, the inter-phase insulation paper sheet 81 of Embodiment 5 is characterized in that the center portion 83A-1 of the base portion 83A is fixed to the fixed portion 82 by being inserted into the slit hole 89 provided in the fixed portion 82. Accordingly, fixing means can be realized which allows easy fixing of the center portion 83A-1 of the base portion 83A of the movable portion 83 to the fixed portion 82.

Embodiment 6

First, the configuration of an inter-phase insulation paper sheet 91 for a three-phase AC motor according to Embodiment 6 of the present invention will be described based on Parts (a) to (f) of FIG. 10.

As shown in Parts (a) and (b) of FIG. 10, the inter-phase insulation paper sheet 91 of Embodiment 6 is a single rectangular sheet, and a side thereof above a center fold line (an imaginary line: the line may be an actually drawn line) 92 (one end side) is a fixed portion 93 while a side thereof below the fold line 92 (the other end side) is a movable portion 94. That is, the inter-phase insulation paper sheet 91 has the fixed portion 93 and the movable portion 94 integral with each other. Moreover, a side of the movable portion 94 above a center fold line (an imaginary line: the line may be an actually drawn line) 95 (one end side) is a base portion 94A while a side thereof below the fold line 95 (the other end side) is a collar portion 94B. Note that although the width of the movable portion 94 is set smaller than the width of the fixed portion 93 in the illustrated example, the present invention is not limited to this configuration. For example, the movable portion 94 and the fixed portion 93 may have the same width.

Further, in the inter-phase insulation paper sheet 91, a collar portion 94C is provided to the collar portion 94B as an extension, so that the movable portion 94 (the base portion 94A, the collar portion 94B, and the extension collar portion 94C) is longer than the fixed portion 93. Reference numeral 102 in the drawings denotes a fold line (an imaginary line: the line may be an actually drawn line) between the collar portion 94B and the extension collar portion 94C.

Figures 10A, 10B:
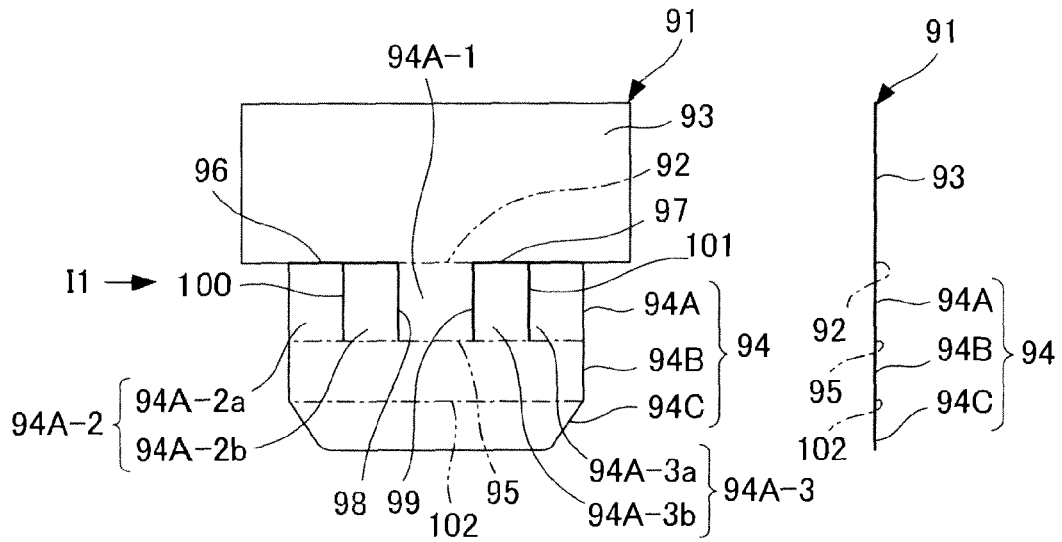
FIG. 10 Part (a) is a front view showing a state before a fixed portion and a movable portion of an inter-phase insulation paper sheet for a three-phase AC motor according to Embodiment 6 of the present invention are set to overlap (folded over) each other. Part (b) is a side view seen in the direction of arrow I1 in Part (a). Part (c) is a front view showing a state where the fixed portion and the movable portion of the inter-phase insulation paper sheet are set to overlap each other. Part (d) is a side view seen in the direction of arrow I2 in Part (c). Part (e) is a front view showing a state where a collar portion of the inter-phase insulation paper sheet is folded. Part (f) is a cross-sectional view taken along line I3-I3 in Part (e) and seen in the direction of arrows I3 in Part (e).
Figures 10C, 10D:
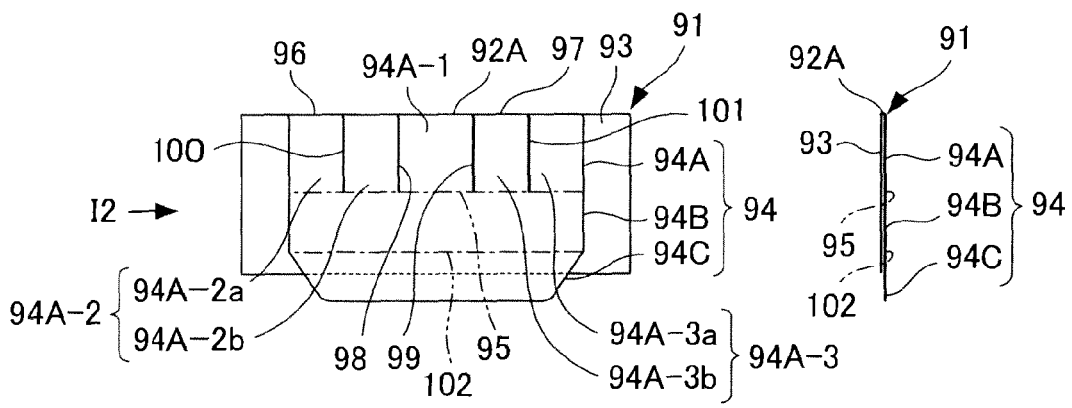
Figures 10E, 10F:
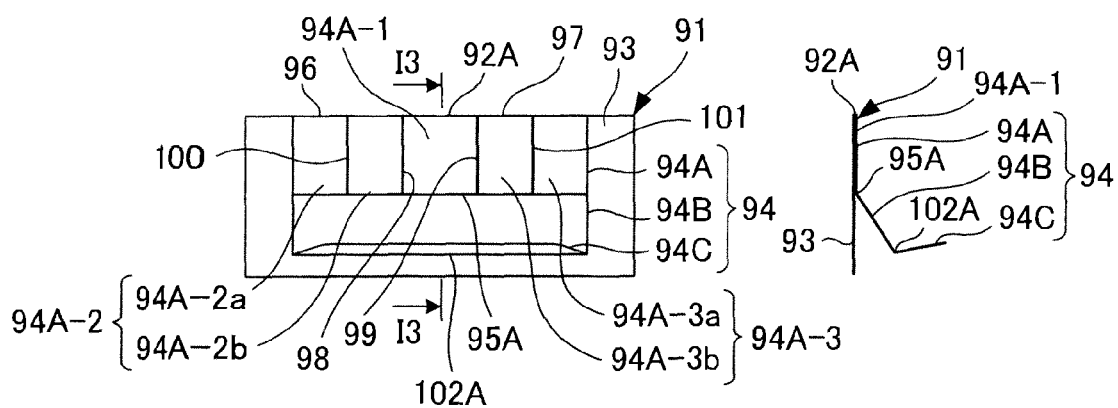
Figure 11A:
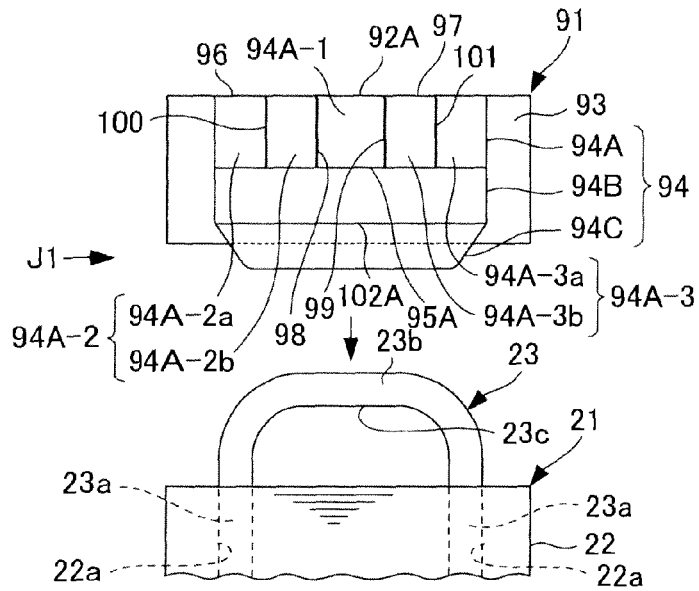
FIG. 11 Part (a) is a front view showing a state where the inter-phase insulation paper sheet for a three-phase AC motor according to Embodiment 6 of the present invention is about to be inserted between coil ends of different phases. Part (b) is a side view seen in the direction of arrow J1 in Part (a). Part (c) is a front view showing a state where the inter-phase insulation paper sheet is inserted between the coil ends of the different phases. Part (d) is a side view seen in the direction of arrow J2 in Part (c). Part (e) is a cross-sectional view taken along line J3-J3 in Part (c) and seen in the direction of arrows J3 in Part (c).
Figure 11B:
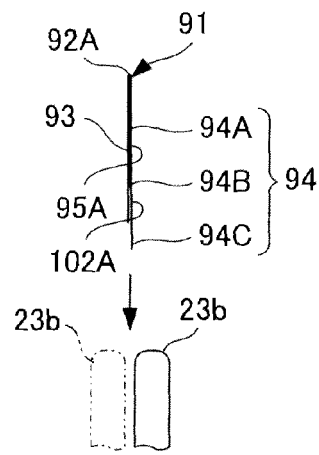
Figure 11C:
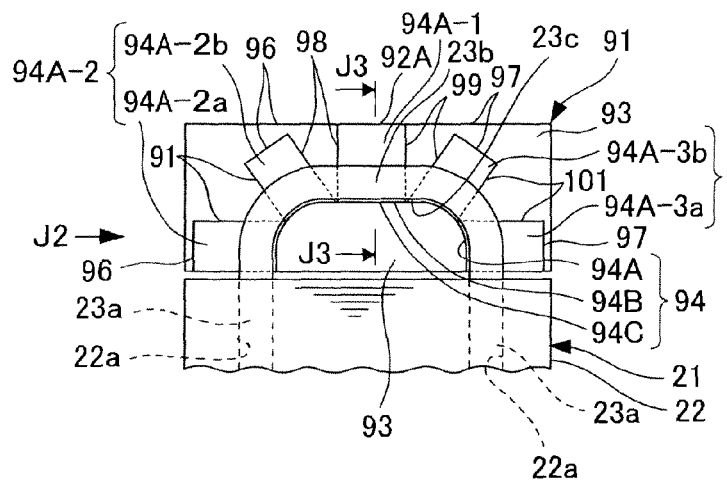
Figure 11D:
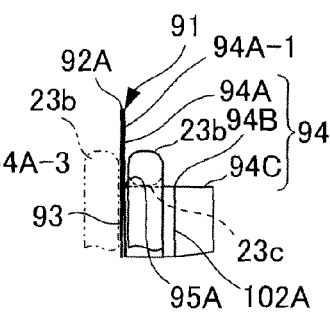
Figure 11E:
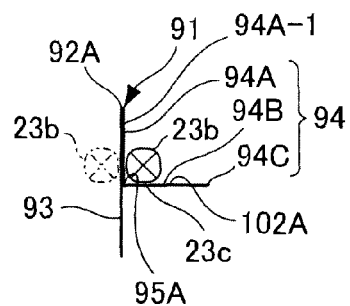
Figure 12A:
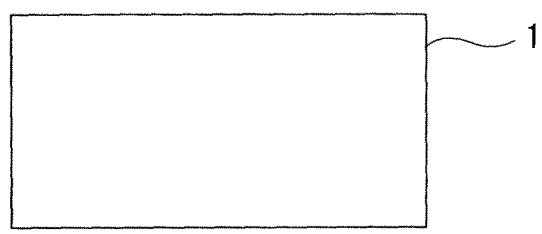
FIG. 12 Part (a) is a front view showing a conventional inter-phase insulation paper sheet for a three-phase AC motor. Part (b) is another conventional inter-phase insulation paper sheet for a three-phase AC motor.
Figure 12B:
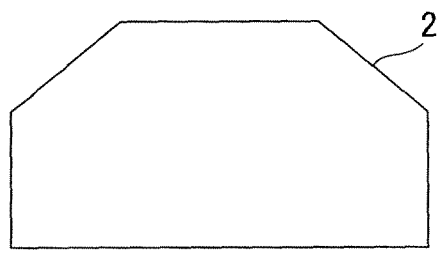

Moreover, slits 96 and 97 extending in a width direction (the width direction of the inter-phase insulation paper sheet 91: the horizontal direction in Part (a) of FIG. 10) are provided between the fixed portion 93 and the base portion 94A of the movable portion 94 on both sides in the width direction. For this reason, the base portion 94A is shaped to have a center portion 94A-1 which is connected to the fixed portion 93 and side portions 94A-2 and 94A-3 which are separated from the fixed portion 93. Moreover, slits 98 and 99 extending in a longitudinal direction (the longitudinal direction of the inter-phase insulation paper sheet 91: the vertical direction in Part (a) of FIG. 10) are provided between the center portion 94A-1 and the side portions 94A-2 and 94A-3 of the base portion 94A. That is, the side portions 94A-2 and 94A-3 are separated from the fixed portion 93 in the longitudinal direction by the slits 96 and 97, and also separated from the center portion 94A-1 in the width direction by the slits 98 and 99.

Further, the side portion 94A-2 is provided with a slit 100 extending in the longitudinal direction and thereby split into two portions, or a first split portion 94A-2a and a second split portion 94A-2b. Likewise, the side portion 94A-3 is provided with a slit 101 extending in the longitudinal direction and thereby split into two portions, or a first split portion 94A-3a and a second split portion 94A-3b. Note that each of the side portions 94A-2 and 94A-3 can be split not only into two portions but also into three or more portions by providing them with two or more slits extending in the longitudinal direction.

As shown in Parts (c) and (d) of FIG. 10, the inter-phase insulation paper sheet 91 is folded (mountain folded) along the fold line 92, so that the fixed portion 93 and the movable portion 94 are set in an overlapping state. Reference numeral 92A in the drawings denotes the crease created by folding the inter-phase insulation paper sheet 91 along the fold line 92.

Further, as shown in Parts (e) and (f) of FIG. 10, the center portion 94A of the base portion 94A of the movable portion 94 is fixed to the fixed portion 93 by use of fixing means such as adhesive, insulating tape, double-sided tape, or thermal welding, while the collar portion 94B of the movable portion 94 is folded (valley folded) along the fold line 95 to be in a state of being away from the fixed portion 93. Moreover, the collar portion 94C of the movable portion 94 is folded (valley folded) along the fold line 102 to be in a state of being away from the fixed portion 93. Reference numerals 95A and 102A in the drawings denote the creases created by folding the inter-phase insulation paper sheet 91 along the fold lines 95 and 102. Note that since the inter-phase insulation paper sheet 91 has the fixed portion 93 and the movable portion 94 integral with each other, the center portion 94A-1 of the base portion 94A may simply be folded over the fixed portion 93, instead of being fixed to the fixed portion 93 by use of the above-mentioned fixing means.

Next, insertion of the inter-phase insulation paper sheet 91 between coil ends 23b of different phases will be described based on Parts (a) to (e) of FIG. 11.

The configuration of a stator 21 of a three-phase AC motor shown in Part (a) of FIG. 11 is the same as that of the stator 21 of the three-phase AC motor shown in Part (a) of FIG. 2 mentioned earlier, and thus specific description thereof is omitted here. Moreover, in Embodiment 6, in order to provide insulation between the adjacent coil ends 23b of different phases in the stator 21, the inter-phase insulation paper sheet 91 is inserted between these coil ends 23b.

As shown in Parts (a) and (b) of FIG. 11, to insert the inter-phase insulation paper sheet 91 between the adjacent coil ends 23b of different phases, the inter-phase insulation paper sheet 91 is folded along the fold line 92 (crease 92A) to make the fixed portion 93 and the movable portion 94 overlap each other, and further the center portion 94A-1 of the base portion 94A is fixed to the fixed portion 93 by use of the above-mentioned fixing means (here, the center portion 94A-1 may not be fixed, as mentioned above). Moreover, the collar portion 94B and the extension collar portion 94C are folded along the fold lines 95 and 102 to create the creases 95A and 102A, and are then unfolded. This is because it is difficult to insert the inter-phase insulation paper sheet 91 between the coil ends 23b with the collar portion 94B and the extension collar portion 94C being folded. Thus, at the time of the insertion, the entire movable portion 94 (the base portion 94A, the collar portion 94B, and the extension collar portion 94C) is set to overlap the fixed portion 93 to make the inter-phase insulation paper sheet 91 thin.

Thereafter, the inter-phase insulation paper sheet 91 in this overlapping state is inserted between the coil ends 23b of the different phases.

As shown in Parts (c) to (e) of FIG. 11, once the inter-phase insulation paper sheet 91 is inserted between the coil ends 23b, the collar portion 94B and the extension collar portion 94C are drawn out of the insulation-paper-sheet insertion side of one of the coil ends 23b of the different phases (the side where the fixed portion 93 and the base portion 94A are inserted) to the opposite insulation-paper-sheet insertion side of the one coil end 23b (the opposite side to the insulation-paper-sheet insertion side) through an inner side 23c of the one coil end 23b. Specifically, in this step, the inter-phase insulation paper sheet 91 is in a state where the fixed portion 93 and the base portion 94A overlap each other and are inserted between the coil ends 23b of the different phases while the collar portion 94B and the extension collar portion 94C are drawn out of the insulation-paper-sheet insertion side of one of the coil ends 23b to the opposite insulation-paper-sheet insertion side of the one coil end 23b through the inner side 23c of the one coil end 23b.

Meanwhile, when the collar portion 94B and the extension collar portion C are drawn out from the inner side 23c of the coil end 23b and curved along the curved shape of the inner side 23c of the coil end 23b, the base portion 94A is accordingly deformed such that the center portion 94A-1 and each of the first split portion 94A-2a and second split portion 94A-2b of the side portion 94A-2 and the first split portion 94A-3a and second split portion 94A-3b of the side portion 94A-3 are set in a state of spreading out in a V shape (a fan shape).

Thereafter, though not illustrated, the fixed portion 93 and the movable portion 94 (the base portion 94A, the collar portion 94B, and the extension collar portion 94C) of the inter-phase insulation paper sheet 91 are fixed to the coil ends 23b by, for example, being tied thereto with a lace (lacing).

Note that the fixed portion 93 is not limited to the rectangular shape shown in the illustrated example and may be in any shape. For example, the fixed portion 93 may be formed in a shape that fits better into the shapes of the coil ends 23b by cutting off a center portion of a given side and corners. Moreover, the extension collar portion 94C is not limited to the trapezoidal shape shown in the illustrated example and may be in any shape. For example, the extension collar portion 94C may be in a rectangular shape or the like.

Moreover, though not illustrated, the inter-phase insulation paper sheet 91 is not limited to one that has its fixed portion 93 and movable portion 94 integral with each other. The inter-phase insulation paper sheet 91 may be one that has its fixed portion 93 and movable portion 94 separated from each other as in Embodiments 4 and 5 described above.

As described above, the inter-phase insulation paper sheet 91 of Embodiment 6 is an inter-phase insulation paper sheet 91 configured to be inserted between the coil ends 23b of different phases provided to the stator core 22 so as to provide insulation between the coil ends 23b of the different phases, characterized in that: the inter-phase insulation paper sheet 91 includes the fixed portion 93 and the movable portion 94; the movable portion 94 has the base portion 94A on one end side and the collar portion 94B on the other end side; the fixed portion 93 and the base portion 94A overlap each other and are inserted between the coil ends 23b of the different phases while the collar portion 94B is drawn out of the insulation-paper-sheet insertion side of one of the coil ends 23b of the different phases to the opposite insulation-paper-sheet insertion side of the one coil end 23b through the inner side 23c of the one coil end 23b; and the fixed portion 93 and the movable portion 94 are integral with each other. Accordingly, the same operations and effects as the inter-phase insulation paper sheet 11 of Embodiment 1 described above can be achieved.

Further, the inter-phase insulation paper sheet 91 of Embodiment 6 is characterized in that: the slits 96 and 97 extending the width direction are provided between the fixed portion 93 and the base portion 94A of the movable portion 94 on both sides in the width direction, so that the base portion 94A is shaped to have the center portion 94A-1 which is connected to the fixed portion 93 and the side portions 94A-2 and 94A-3 which are separated from the fixed portion 93; the slits 98 and 99 extending in the longitudinal direction are provided between the center portion 94A-1 and the side portions 94A-2 and 94A-3 of the base portion 94A; the center portion 94A-1 and each of the side portions 94A-2 and 94A-3 are in a state of spreading out in a V shape; the side portions 94A-2 and 94A-3 of the base portion 94A are provided with the slits 100 and 101 extending in the longitudinal direction to be split into two portions; and each of these split portions 94A-2a, 94A-2b, 94A-3a, and the 94A-3b and the center portion 94A-1 are in a state of spreading out in a V shape. Accordingly, the same operations and effects as the inter-phase insulation paper sheet 31 of Embodiment 2 described above can be achieved.

Furthermore, the inter-phase insulation paper sheet 91 of Embodiment 6 is characterized in that the extension collar portion 94C is provided to the collar portion 94B of the movable portion 94. Accordingly, the laying of the collar portions 94B and 94C over the coil end 23b can be done reliably.

Note that the application of the inter-phase insulation paper sheets of the present invention is not limited to three-phase AC motors; the inter-phase insulation paper sheets of the present invention are applicable to rotating electric machines other than three-phase AC motors (such as three-phase AC generators as well as AC motors and AC generators of multiple phases other than three phases).

INDUSTRIAL APPLICABILITY

The present invention relates to an inter-phase insulation paper sheet for a rotating electric machine and is usefully applicable as an inter-phase insulation paper sheet for providing insulation between coil ends of different phases provided to the stator core of a three-phase AC motor or the like.

EXPLANATION OF THE REFERENCE NUMERALS 11 inter-phase insulation paper sheet
12 fold line
12A crease
13 fixed portion
14 movable portion
14A base portion
14B collar portion
15 fold line
15A crease
21 stator
22 stator core
22a slot
23 coil
23a coil side 23b coil end
23c inner side
31 inter-phase insulation paper sheet
32 fold line
32A crease
33 fixed portion
34 movable portion
34A base portion
34A-1 center portion
34A-2, 34A-3 side portion
34A-2a, 34A-3a first split portion
34A-2b, 34A-3b second split portion
34B collar portion
35 fold line
35A crease
36, 37, 38, 39, 40, 41 slit
51 inter-phase insulation paper sheet
52 fold line
52A crease
53 fixed portion
54 movable portion
54A base portion
54A-1 center portion
54A-2, 54A-3 side portion
54A-2a, 54A-3a first split portion
54A-2b, 54A-3b second split portion
54B collar portion
55 fold line
55A crease
56, 57, 58, 59, 60, 61 slit
62 protrusion
71 inter-phase insulation paper sheet
72 fixed portion
73 movable portion
73A base portion
73A-1 center portion
73A-2, 73A-3 side portion
73A-2a, 73A-3a first split portion
73A-2b, 73A-3b second split portion
73B collar portion
74 fold line
74A crease
75, 76, 77, 78 slit
81 inter-phase insulation paper sheet
82 fixed portion
83 movable portion
83A base portion
83A-1 center portion
83A-2, 83A-3 side portion
83A-2a, 83A-3a first split portion
83A-2b, 83A-3b second split portion
83B collar portion
84 fold line
84A crease
85, 86, 87, 88 slit
89 slit hole
91 inter-phase insulation paper sheet
92 fold line
92A crease
93 fixed portion
94 movable portion
94A base portion
94A-1 center portion
94A-2, 94A-3 side portion
94A-2a, 94A-3a first split portion
94A-2b, 94A-3b second split portion
94B collar portion
94C extension collar portion
95 fold line
95A crease
96, 97, 98, 99, 100, 101 slit
102 fold line
102A crease

The invention claimed is:

1. An inter-phase insulation paper sheet for a rotating electric machine configured to be inserted between coil ends of different phases provided to a stator core of the rotating electric machine so as to provide insulation between the coil ends of the different phases, wherein
the inter-phase insulation paper sheet comprises a fixed portion and a movable portion,
the movable portion has a base portion on one end side and a collar portion on the other end side, and
the fixed portion and the base portion overlap each other and are inserted between the coil ends of the different phases while the collar portion is drawn, perpendicularly to the base portion, out of an insulation-paper-sheet insertion side of one of the coil ends of the different phases to an opposite insulation-paper-sheet insertion side of the one coil end through an inner side of the one coil end.

2. The inter-phase insulation paper sheet for a rotating electric machine according to claim 1, wherein the fixed portion and the movable portion are integral with each other.

3. The inter-phase insulation paper sheet for a rotating electric machine according to claim 1, wherein the fixed portion and the movable portion are separated from each other.

4. The inter-phase insulation paper sheet for a rotating electric machine according to claim 1, wherein a protrusion is given to the collar portion of the movable portion.

5. The inter-phase insulation paper sheet for a rotating electric machine according to claim 1, wherein an extension collar portion is provided to the collar portion of the movable portion.

6. An inter-phase insulation paper sheet for a rotating electric machine configured to be inserted between coil ends of different phases provided to a stator core of the rotating electric machine so as to provide insulation between the coil ends of the different phases, wherein
the inter-phase insulation paper sheet comprises a fixed portion and a movable portion,
the movable portion has a base portion on one end side and a collar portion on the other end side, and
the fixed portion and the base portion overlap each other and are inserted between the coil ends of the different phases while the collar portion is drawn, perpendicularly to the base portion, out of an insulation-paper-sheet insertion side of one of the coil ends of the different phases to an opposite insulation-paper-sheet insertion side of the one coil end through an inner side of the one coil end,
wherein the fixed portion and the movable portion are integral with each other,
a slit extending in a width direction is provided between the fixed portion and the base portion of the movable portion on both sides in the width direction, so that the base portion is shaped to have a center portion which is connected to the fixed portion and side portions which are separated from the fixed portion,
a slit extending in a longitudinal direction is provided between the center portion and each of the side portions of the base portion, and the center portion and each of the side portions are in a state of spreading out in a V shape.

7. The inter-phase insulation paper sheet for a rotating electric machine according to claim 6, wherein
each of the side portions of the base portion is provided with at least one slit extending in the longitudinal direction to be split into at least two portions, and
each of the split portions and the center portion are in a state of spreading out in a V shape.

8. An inter-phase insulation paper sheet for a rotating electric machine configured to be inserted between coil ends of different phases provided to a stator core of the rotating electric machine so as to provide insulation between the coil ends of the different phases, wherein
the inter-phase insulation paper sheet comprises a fixed portion and a movable portion,
the movable portion has a base portion on one end side and a collar portion on the other end side, and
the fixed portion and the base portion overlap each other and are inserted between the coil ends of the different phases while the collar portion is drawn, perpendicularly to the base portion, out of an insulation-paper-sheet insertion side of one of the coil ends of the different phases to an opposite insulation-paper-sheet insertion side of the one coil end through an inner side of the one coil end,
wherein the fixed portion and the movable portion are separated from each other,
a center portion of the base portion of the movable portion is fixed to the fixed portion by use of fixing means,
a slit extending in a longitudinal direction is provided between the center portion and each of side portions of the base portion, and
the center portion and each of the side portions are in a state of spreading out in a V shape.

9. The inter-phase insulation paper sheet for a rotating electric machine according to claim 8, wherein the center portion of the base portion is fixed to the fixed portion by being inserted into a slit hole provided in the fixed portion.

10. The inter-phase insulation paper sheet for a rotating electric machine according to claim 8, wherein
each of the side portions of the base portion is provided with at least one slit extending in the longitudinal direction to be split into at least two portions, and
each of the split portions and the center portion are in a state of spreading out in a V shape.

* * * * *